US010857862B2

(12) United States Patent
Grimaldo

(10) Patent No.: US 10,857,862 B2
(45) Date of Patent: Dec. 8, 2020

(54) DUAL PANEL SUNROOF SYSTEMS AND APPARATUS FOR USE WITH VEHICLES

(71) Applicant: AISIN TECHNICAL CENTER OF AMERICA, INC., Northville, MI (US)

(72) Inventor: Jacob Grimaldo, Northville, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 132 days.

(21) Appl. No.: 16/276,714

(22) Filed: Feb. 15, 2019

(65) Prior Publication Data

US 2020/0262278 A1    Aug. 20, 2020

(51) Int. Cl.
*B60J 10/12* (2006.01)
*B60J 7/047* (2006.01)
*B60J 7/057* (2006.01)

(52) U.S. Cl.
CPC ............. *B60J 7/047* (2013.01); *B60J 7/0573* (2013.01)

(58) Field of Classification Search
CPC . B60J 7/043; B60J 7/0435; B60J 7/047; B60J 7/0573; B60J 7/024; B32B 17/10761
See application file for complete search history.

(56) References Cited

U.S. PATENT DOCUMENTS

| | | | | |
|---|---|---|---|---|
| 4,159,144 A | * | 6/1979 | Ehlen ..................... | B60J 7/022 296/216.04 |
| 5,197,779 A | * | 3/1993 | Mizuno .................. | B60J 7/043 296/216.03 |
| 6,443,520 B1 | | 9/2002 | Schmaelzle et al. | |
| 6,726,275 B2 | | 4/2004 | Hendricus Schrans | |
| 7,229,126 B2 | * | 6/2007 | Seifert ................... | B60J 7/0435 296/216.03 |
| 7,296,851 B2 | * | 11/2007 | Kronseder .............. | B60J 7/047 296/216.03 |
| 7,374,235 B2 | | 5/2008 | Queveau et al. | |
| 7,878,581 B2 | * | 2/2011 | Faerber .................. | B60J 7/0435 296/216.03 |
| 8,388,053 B2 | * | 3/2013 | Kikuchi .................. | B60J 10/82 296/216.05 |

(Continued)

FOREIGN PATENT DOCUMENTS

| | | |
|---|---|---|
| DE | 100 54 322 A1 | 5/2002 |
| EP | 1 669 233 A1 | 6/2006 |
| JP | 7-276994 | 12/1995 |

*Primary Examiner* — Kiran B Patel
(74) *Attorney, Agent, or Firm* — Oblon, McClelland, Maier & Neustadt, L.L.P.

(57) ABSTRACT

Dual panel sunroof systems and apparatus for use with vehicles are disclosed. A disclosed sunroof for a vehicle includes a first bracket movable along a rail and coupled to a first panel. The sunroof also includes a second bracket movable along the rail and coupled to a second panel. The sunroof also includes an actuator configured to move the first or second bracket. Movement of the first bracket is to position the first panel over the second panel. Movement of the second bracket is to position the second panel over the first panel. The sunroof also includes a central guide block operatively interposed between the first and second brackets to guide movement thereof. The central guide block configured to apply a resistance to at least a first end of the first bracket to enable the actuator to raise or lower the first panel.

18 Claims, 14 Drawing Sheets

(56) References Cited

U.S. PATENT DOCUMENTS

| | | | |
|---|---|---|---|
| 8,523,278 B2* | 9/2013 | Renaudin | B60J 7/0435 |
| | | | 296/223 |
| 8,807,640 B2* | 8/2014 | Sawada | B60J 7/043 |
| | | | 296/216.06 |
| 9,636,980 B2* | 5/2017 | Van Boxtel | B60J 7/0435 |
| 9,776,486 B2* | 10/2017 | Wingen | B60J 7/024 |
| 9,821,643 B1* | 11/2017 | Heins | B60J 7/024 |
| 10,239,391 B1* | 3/2019 | Heins | B60J 7/0435 |
| 10,532,639 B1* | 1/2020 | Grimaldo | B60J 7/043 |
| 10,618,387 B2* | 4/2020 | Katsura | B60J 7/043 |
| 2008/0303316 A1* | 12/2008 | Mooney | B60J 7/0435 |
| | | | 296/216.05 |
| 2010/0077952 A1* | 4/2010 | de Waal | B60J 7/0435 |
| | | | 114/177 |
| 2011/0080023 A1* | 4/2011 | Geurts | B60J 7/024 |
| | | | 296/216.05 |
| 2012/0112496 A1* | 5/2012 | Maruyama | B60J 7/022 |
| | | | 296/216.04 |
| 2013/0307296 A1* | 11/2013 | Sawada | B60J 7/053 |
| | | | 296/222 |
| 2015/0069793 A1* | 3/2015 | Katsura | B60J 7/024 |
| | | | 296/216.03 |
| 2015/0246599 A1* | 9/2015 | Sawada | B60J 7/047 |
| | | | 296/220.01 |
| 2015/0246600 A1* | 9/2015 | Sawada | B60J 7/043 |
| | | | 296/220.01 |
| 2016/0185196 A1* | 6/2016 | Ohdoi | B60J 7/022 |
| | | | 296/221 |
| 2016/0312506 A1* | 10/2016 | Park | B60J 7/047 |
| 2017/0368921 A1* | 12/2017 | Katsuramaki | B60J 7/043 |
| 2018/0111465 A1* | 4/2018 | Hall | B60J 10/82 |
| 2018/0201102 A1* | 7/2018 | Park | B60J 7/022 |
| 2019/0165530 A1* | 5/2019 | Katsuramaki | B60J 7/043 |
| 2019/0366816 A1* | 12/2019 | Takakura | B60J 7/053 |
| 2019/0366817 A1* | 12/2019 | Allen | B60J 7/043 |
| 2020/0079193 A1* | 3/2020 | Grimaldo | B60J 7/022 |
| 2020/0079194 A1* | 3/2020 | Katsura | B60J 7/22 |
| 2020/0114742 A1* | 4/2020 | Grimaldo | B60J 7/057 |

* cited by examiner

DUAL PANEL SUNROOF SYSTEMS AND APPARATUS FOR USE WITH VEHICLES

FIELD OF THE DISCLOSURE

This disclosure relates generally to vehicles and, more particularly, to dual panel sunroof systems and apparatus for use with vehicles.

BACKGROUND

Motor vehicles typically employ sunroofs to improve comfort of vehicle occupants by allowing sunlight to enter a vehicle cabin through a sunroof panel (e.g., glass). Such vehicle sunroofs are configured to open and close, which may be desirable to the vehicle occupants (e.g., when the vehicle cabin is relatively hot). For example, a vehicle sunroof may have a panel that is structured and/or configured to move (e.g., tilt, raise, slide, lower, etc.) to open and close the sunroof in response to a motor output applied to the panel.

SUMMARY

An aspect of the present disclosure includes a sunroof for a vehicle. The sunroof includes a first bracket movable along a rail and coupled to a first panel. The sunroof also includes a second bracket movable along the rail and coupled to a second panel. The sunroof also includes an actuator configured to move the first or second bracket. Movement of the first bracket is to position the first panel over the second panel. Movement of the second bracket is to position the second panel over the first panel. The sunroof also includes a central guide block operatively interposed between the first and second brackets to guide movement thereof. The central guide block is configured to apply a resistance to at least a first end of the first bracket to enable the actuator to raise or lower the first panel.

In a further aspect of the present disclosure, the central guide block defines a first channel configured to slidably receive a first pin coupled to the first bracket and a second channel configured to slidably receive a second pin coupled to the second bracket. At least the first channel is to guide the first pin through the first channel and into the second bracket as the first panel moves over the second panel.

In a further aspect of the present disclosure, the first channel is positioned on a first side of the central guide block and the second channel is positioned on a second side of the central guide block opposite the first side.

In a further aspect of the present disclosure, the first channel includes first portion and a second portion connected to the first portion. The first portion is substantially perpendicular relative to the second portion.

In a further aspect of the present disclosure, the first portion extends substantially along a vertical axis and the second portion extends substantially along a horizontal axis.

In a further aspect of the present disclosure, the central guide block includes an inner surface that forms the first channel and corresponds to the first portion. The inner surface is configured to impart a force on the first pin to substantially prevent the first pin from moving in a horizontal direction.

In a further aspect of the present disclosure, the central guide block includes an inner surface that forms the first channel and corresponds to the second portion. The inner surface is configured to impart a force on the first pin to substantially prevent the first pin from moving in a vertical direction.

In a further aspect of the present disclosure, the second bracket includes a third channel positioned thereon that is configured to slidably receive the first pin from the first channel of the central guide block.

In a further aspect of the present disclosure, the second bracket includes a first portion and a second portion coupled to the first portion. The first portion supports the second panel and includes a track that defines the third channel.

In a further aspect of the present disclosure, the first portion of the second bracket includes a wall and a space formed by the wall and the track. A joint of the second bracket couples the first and second portions together and is at least partially positioned within the space.

In a further aspect of the present disclosure, the joint includes a clinched joint formed by the first and second portions.

In a further aspect of the present disclosure, the first portion includes aluminum and the second portion includes steel.

In a further aspect of the present disclosure, the sunroof also includes first and second end guide blocks positioned on opposite ends of the rail. The first end guide block is configured to slidably receive a first pair of pins coupled to the first bracket. The second end guide block is configured to slidably receive a second pair of pins coupled to the second bracket. At least the first end guide block is configured to raise or lower a second end of the first panel, opposite the first end, as the first pair of pins travels through the first end guide block.

In a further aspect of the present disclosure, the first end guide block defines a first pair of channels configured to guide the first pair of pins through the first pair of channels and into the rail.

In a further aspect of the present disclosure, the first bracket includes an arm and a U-shaped portion coupled to the arm at or near an end of the arm. The first pair of pins is coupled to the U-shaped portion.

In a further aspect of the present disclosure, the actuator includes a link rotatably coupled to the first bracket and movable along the sunroof rail. The actuator also includes a shoe slidably coupled to the first link and movable along the sunroof rail. Movement of the first shoe relative to the link is to rotate the link.

In a further aspect of the present disclosure, the first shoe defines first and second channels that slidably receive respective first and second pins coupled to the link. The first pin and the first channel form a first joint. The second pin and the second channel form a second joint. The link is rotatable relative to the first or second joint based on a position of the shoe relative to the link.

In a further aspect of the present disclosure, the first channel is L-shaped and the second channel is Z-shaped.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Figure 1:
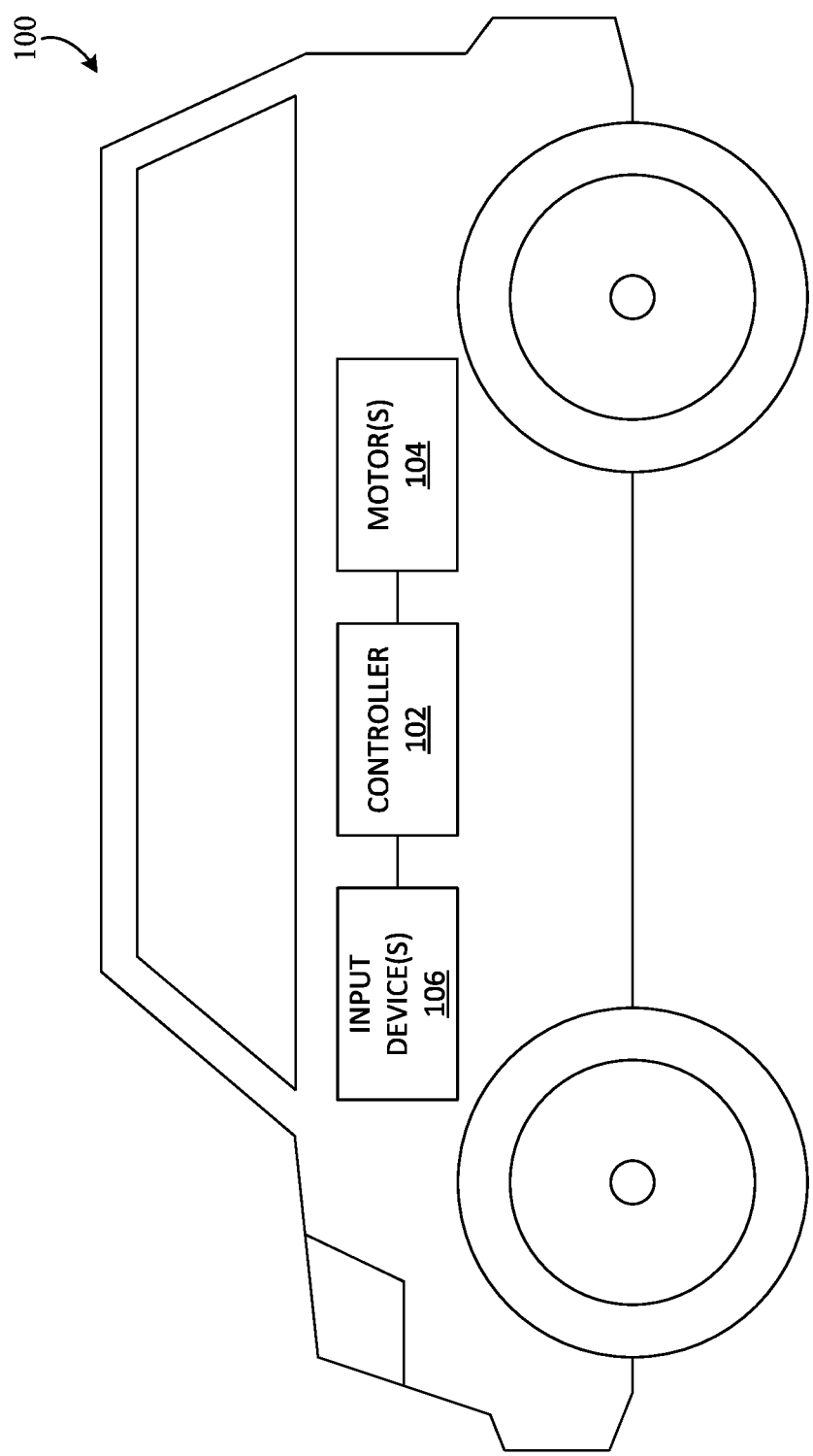
FIG. 1 is a view of an example vehicle in which examples disclosed herein can be implemented.

Some known vehicle sunroofs have two panels that are each moveable to open the sunroof. For example, a known sunroof includes a first panel and a second panel operatively coupled to rails, brackets, shoes, links, motors, etc. that are configured such that each panel can be positioned over the other. That is, the first panel can move over the second panel and the second panel can move over the first panel. In this manner, vehicle occupants in different locations (e.g., a front seat, a back seat, etc.) can enjoy use of such sunroofs. However, to provide such functionality associated with the two panels, these known vehicle sunroofs have complex designs and numerous moving components, which incur substantial costs. As result, these known vehicle sunroofs are expensive and/or time consuming to produce.

Dual panel sunroof systems and apparatus for use with vehicles are disclosed. Examples disclosed herein provide an example sunroof for a vehicle including a first example sunroof panel and a second example sunroof panel, each of which is configured to move over the other to open the sunroof. In particular, the disclosed sunroof includes an example guide system (e.g., one or more sunroof rails, one or more guide blocks, one or more tracks, etc.) that is structured and/or configured to guide movement of example panel brackets coupled to and/or supporting the respective sunroof panels and, thus, guide movement of the sunroof panels. For example, a first disclosed panel bracket is movable via the disclosed guide system from a first position (e.g., a lowered position) in which the first panel is adjacent the second panel to a second position (e.g., a tilted position and/or a raised position) in which the first panel at least partially covers and/or extends over the second panel. Similarly, a second disclosed panel bracket is moveable via the disclosed guide system from a first position (e.g., a lowered position) in which the second panel is adjacent the first panel to a second position (e.g., a tilted position and/or a raised position) in which the second panel at least partially covers and/or extends over the first panel. In this manner, disclosed examples allow multiple vehicle occupants sitting in different areas of the vehicle to enjoy use of the disclosed sunroof, which may be desirable to the vehicle occupants and/or improve comfort.

Some disclosed examples provide one or more example actuators that are structured and/or configured to control movement (e.g., tilting, raising, sliding, lowering, etc.) of the first panel bracket and/or the second panel bracket between the respective first and second positions based on motor output applied to the actuator(s). In such examples, to enable the disclosed actuator(s) to properly actuate, disclosed examples provide one or more example guide blocks (e.g., two central guide blocks end four end guide blocks) that interact with the actuator(s) when opening and/or closing the sunroof. For example, a disclosed central guide block is operatively interposed between the first and second brackets and configured to slidably receive first and second pins coupled to the respective first and second brackets. The central guide block defines a first channel and a second channel that are positioned on opposite sides of the guide block through which the respective first and second pins are to travel. In particular, the central guide block is configured to apply a resistance to a disclosed actuator in response to the actuator receiving the motor output, thereby enabling the actuator to actuate and/or otherwise change state. That is, when the actuator actuates and/or changes from a first state to a second state, the actuator raises or lowers an end of the first panel (i.e., tilts the first panel) and/or an end of the of the second panel (i.e., tilts the second panel). Thus, the disclosed central guide block(s) facilitate raising and/or lowering the ends of the respective panels cooperatively with the actuator(s).

In some examples, a disclosed actuator includes an example link rotatably coupled (e.g., via a pin joint) to the first panel bracket and a shoe slidably coupled to the link. For example, the shoe forms one or more channels that are configured to slidably receive one or more respective pins coupled to the link and guide movement of the pins. In such examples, the shoe and the link are positioned within a rail of the sunroof and configured to slide therethrough, for example, in response to motor output applied to the shoe via a belt, a cable, etc. operatively interposed between the shoe and a motor. In particular, the link is configured to rotate relative to the shoe based on movement of the shoe relative to the link. That is, as the shoe moves through the rail relative to (e.g., toward or away from) the link, the shoe slidably engages the link, thereby rotating the link relative to one or more joints (e.g., pin joint(s)) formed and/or defined by the shoe and the link. As a result, rotation of the link raises and/or lowers the first panel bracket and, thus, raises and/or lowers the first sunroof panel. More particularly, to enable such movement of the shoe relative to the link, the central guide block imparts a force or load (e.g., having a horizontal component) on the first bracket via the first pin, which prevents (e.g., temporarily prevents) the link from sliding through the rail cooperatively and/or together with the shoe until the link has sufficiently rotated, for example, across a predefined angle provided by the channels of the shoe and the pins of the link. The central guide block ceases imparting the force when the bracket pin(s) reach a predefined location (e.g., a curved portion of the guide block channel(s)) within the guide block, which allows the shoe and the link to slide through the rail cooperatively and/or together (e.g., without rotation of the link) to move the first panel over the second panel. Thus, without such resistance generated by the central guide block, the shoe and the link may fail to function properly (e.g., the link may not sufficiently rotate).

In some examples, the second bracket includes a third channel configured to slidably receive the first pin from the central guide block and guide movement of the first pin through the third channel as the first panel tilts and/or moves over the second panel. Thus, the first panel can reliably slide over the second panel via the first pin and the third channel. Similarly, the first bracket includes a fourth channel configured to slidably receive the second pin from the central guide block and guide movement of the second pin through the fourth channel as the second panel tilts and/or moves over the first panel. Thus, the second panel can also reliably slide over the first panel via the second pin and the fourth channel. As a result, in such examples, the first bracket and/or the second bracket save space and/or reduce packaging size of the disclosed sunroof that would have otherwise been occupied by additional components to guide such movement the brackets over each other.

Additionally, in some such examples, each of the disclosed brackets includes a first portion and a second portion coupled to the first portion. In such examples, the first bracket portion is coupled to and/or supports a respective one of the first or second panel, and the second bracket portion has a respective one of the first or second pin positioned thereon. Further, the first bracket portion includes a track positioned thereon that forms and/or defines a respective one of the third or fourth channels. Additionally, in some example, the first and second bracket portions are coupled together via one or more clinching and/or press-forming methods or techniques, which reduces costs and/or production time associated with the disclosed brackets. As a result, in such examples, each of the disclosed brackets includes one or more non-movable or fixed joints (e.g., clinched joint(s)) that are formed and/or defined by the first and second bracket portions, which couple the first and second bracket portions together.

Additionally, some disclosed examples provide one or more (e.g., four) example end guide blocks, which facilitate further tilting the first panel and/or the second panel cooperatively with the disclosed actuator(s). For example, a disclosed end guide block is positioned on and/or coupled to an end of the sunroof rail. In such examples, the end guide block is configured to slidably receive a pair of pins coupled to the first bracket via a pair of channels formed by the end guide block that are substantially curved. In particular, the end guide block is configured to guide the pair of pins into a portion (e.g., a track defining a pair of channels) of the rail as the shoe and link slide the first panel over the second panel to open the sunroof, which raises an opposite end of the first panel. Conversely, the end guide block receives the pair of pins from the rail as the shoe and the link slide the first panel over the second panel to close the sunroof, which lowers the opposite end of the first panel. More particularly, as the pair of pins moves through the pair of channels, the actuator further actuates and/or changes state to allow such function of the end guide block. That is, the actuator further actuates and/or changes from the second state to a third state to allow the end guide block to raise and/or lower the opposite end of the first panel. Thus, in such examples, a single actuator (e.g., one shoe and one link), a single central guide block, and a single end guide block are able to fully raise and/or lower the first or second panel of the sunroof, which would have otherwise been unattainable using the above mentioned known sunroofs. In this manner, disclosed examples reduce a number of links, shoes, and/or, more generally, sunroof actuators that would have otherwise been required by the above-mentioned known sunroofs, which substantially reduces costs associated with the sunroof.

FIG. 1 is a view of an example vehicle (e.g., a car, a van, a truck, a sport utility vehicle (SUV), etc.) 100 in which examples disclosed herein can be implemented. According to the illustrated example of FIG. 1, the vehicle 100 includes an example controller 102, one or more example motors 104, and one or more example input devices 106. In particular, the controller 102 of FIG. 1 is configured to control the motor(s) 104 to open and close an example vehicle sunroof 200 (shown in FIG. 2).

The controller 102 of FIG. 1 can be implemented, for example, using one or more electronic control units (ECUs) that are operatively coupled to the vehicle 100. The controller 102 is communicatively coupled to the input device(s) 106 to receive data therefrom, for example, via a transmission or signal wire, a bus (e.g., a controller area network (CAN)), radio frequency, etc. The controller 102 is also communicatively coupled to the motor(s) 104 to provide electrical power and/or one or more control signals or commands thereto, for example, via a transmission or signal wire, a bus (e.g., a CAN), radio frequency, etc. In some examples, in response to a user providing input to the input device(s) 106, the controller 102 draws power from the vehicle 100 and/or generates the control signal(s) or command(s). Then, the controller 102 provides the power and/or the control signal(s) or command(s) to the motor(s) 104. As a result, the motor(s) 104 generate output (e.g., a torque and/or a force) and apply the output to the sunroof 200. In this manner, the controller 102 operates the sunroof 200 via the motor(s) 104.

The input device(s) 106 of FIG. 1 include, but are not limited to, one or more of a button, a switch, a touch screen, a key fob, and/or any other appropriate device that a person interacts with. In particular, the input device(s) 106 provide a user selection or input (e.g., corresponding to a sunroof opening or closing operation) to the controller 102. In response to such user input(s), the controller 102 controls the motor(s) 104 accordingly, as previously mentioned.

Figure 2:
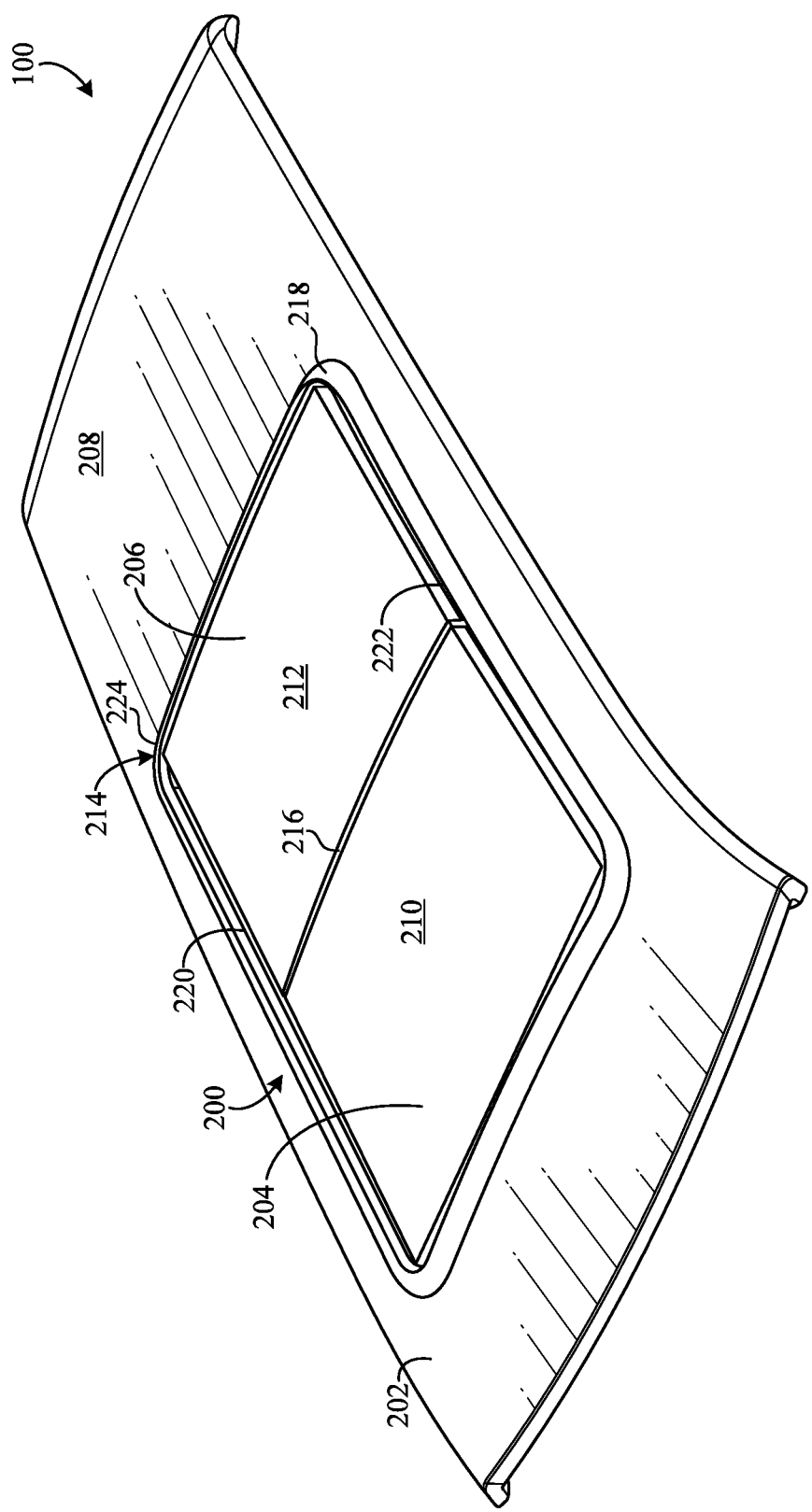
FIG. 2 is a partial-view of the example vehicle of FIG. 1 and shows an example vehicle sunroof in accordance with the teachings of this disclosure.

FIG. 2 is a partial-view of the vehicle 100 and shows the aforementioned sunroof 200 in accordance with the teachings of this disclosure. The sunroof 200 of FIG. 2 can be implemented, for example, using one or more of a panoramic sunroof, a pop-up sunroof, a sliding sunroof, a spoiler sunroof, a dimmable sunroof, etc. As shown in FIG. 2, the sunroof 200 is positioned on and/or coupled to a roof 202 of the vehicle 100, for example, via one or more example fasteners and/or one or more example fastening methods or techniques. According to the illustrated example of FIG. 2, the sunroof 200 includes one or more example movable panels (e.g., glass) 204, 206, two of which are shown in this example (i.e., a first panel 204 and a second panel 206). As shown in FIG. 2, the sunroof 200 is in a closed state whereby the first and second panels 204, 206 are in respective first positions (e.g., lowered positions) thereof. When in the closed state, the sunroof 200 substantially isolates a cabin of the vehicle 100 from an outside environment. For example, the sunroof 200 and the vehicle roof 202 may form a fluid seal to prevent fluid(s) (e.g., air, water, etc.) and/or foreign matter from entering the vehicle cabin when the sunroof 200 is in the closed state.

In particular, each of the first and second panels 204, 206 of FIG. 2 is moveable from the first position to a second position (e.g., a raised position) to provide an open state of the sunroof 200, as discussed further below in connection with FIGS. 2-13A, 13B, and 13C. Additionally, in some examples, each of the first and second panels 204, 206 is moveable to a third or intermediate position (e.g., a tilted position) between the first and second positions to similarly provide the open state of the sunroof 200.

In some examples, the roof 202 and the first and second panels 204, 206 at least partially define an exterior surface 208 of the vehicle 100. As shown in FIG. 2, the first and second panels 204, 206 include respective first and second example surfaces (e.g., outer surfaces) 210, 212. In some examples, the first and second surfaces 210, 212 are substantially adjacent and/or parallel to each other when the sunroof 200 is in the closed state (i.e., when the first panel 204 is in the first position thereof and the second panel is in the first position thereof). That is, the first and second surfaces 210, 212 substantially form a single plane and/or a substantially smooth or continuous surface when the first panel 204 is in the first position thereof and the second panel 206 is in the first position thereof. On the other hand, when the first panel 204 is in the intermediate position thereof or the second panel 206 is in the intermediate position thereof, the first panel 204 and the second panel 206 are not parallel to each other. That is, the first or second panel 204, 206 is at least partially tilted when in the intermediate position thereof such that the outer surfaces 210, 212 form an angle (e.g., a relatively small angle such as 10 degrees, 15 degrees, 30 degrees, etc.).

According to the illustrated example of FIG. 2, the vehicle roof 202 includes an example aperture 214 disposed on the exterior surface 208 within which the sunroof roof 200 is positioned. In some examples, to prevent the fluid(s) (e.g., air, water, etc.) and/or foreign matter from entering the vehicle cabin via the aperture 214, the sunroof 200 includes one or more example sunroof seals (e.g., one or more trim seals) 216, 218, two of which are shown in this example (i.e., a first sunroof seal 216 and a second sunroof seal 218). The first seal 216 is interposed between the first and second panel 204, 206 and is sized, shaped, structured, and/or otherwise configured to sealingly engage the first and second panels 204, 206 when the sunroof 200 is in the closed state. That is, in such examples, the first seal 216 and the first and second panels 204, 206 form a fluid seal, thereby preventing such fluid(s) and/or foreign matter from passing between the first and second panels 204, 206. As shown in FIG. 2, the first seal 216 extends from a first side 220 of the second seal 218 to a second side 222 of the second seal 218 opposite the first side 220.

In some examples, the second seal 218 extends around an example perimeter or edge 224 of the vehicle roof 202 that forms and/or defines the aperture 214. In particular, the second seal 218 is sized, shaped, structured, and/or otherwise configured to sealingly engage the roof 202 and the panel(s) 204, 206 to form another fluid seal, thereby preventing such fluid(s) and/or foreign matter from passing between the roof 202 and the panel(s) 204, 206. In some examples, when the sunroof 200 is in the closed state, the second seal 218 seals both the first and second panels 204, 206, as shown in FIG. 2. However, when the sunroof 200 is in the open state, the second seal 218 seals only one of the first or second panels 204, 206 that is in the respective first position thereof.

Figure 3:
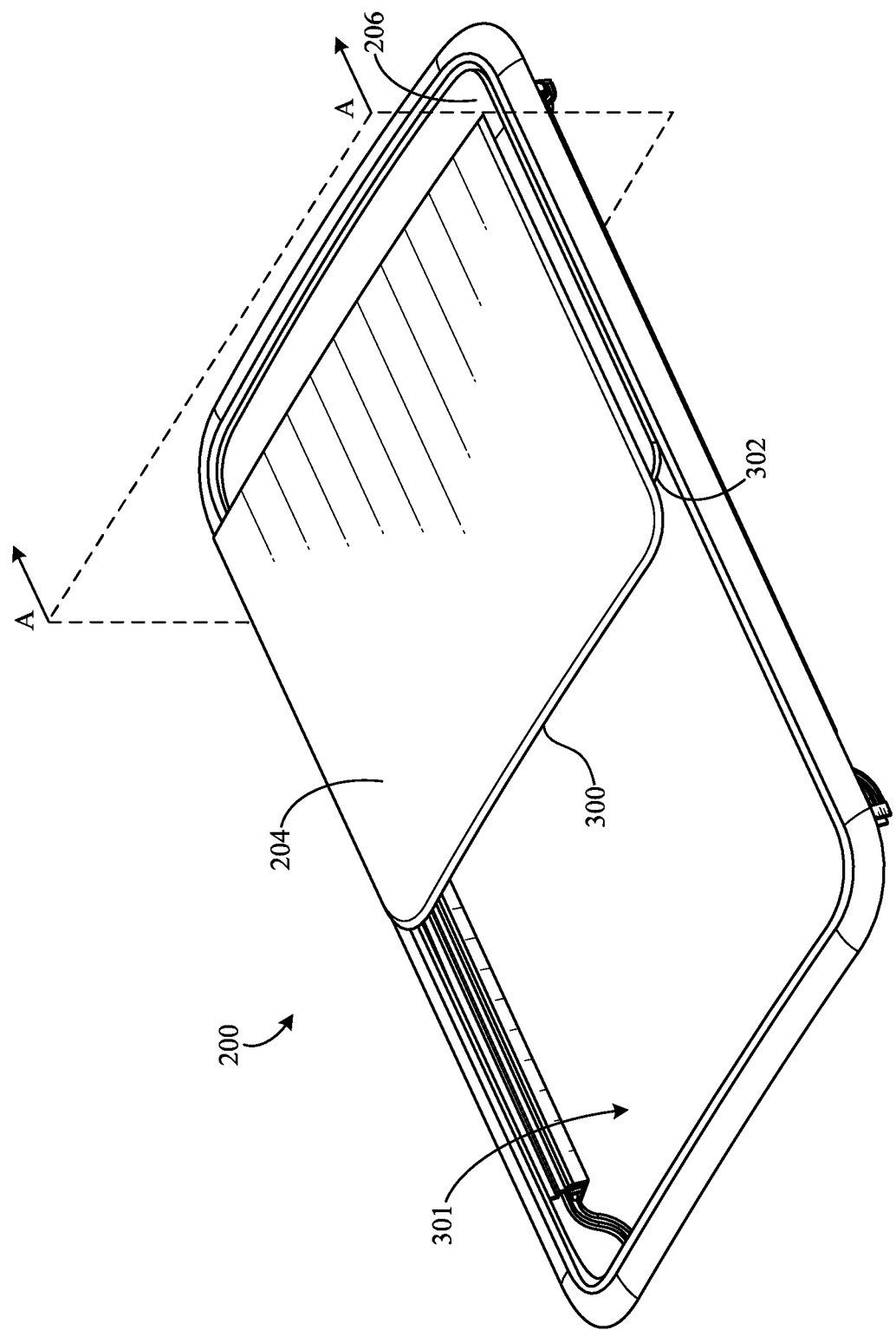
FIGS. 3 and 4 are views of the example vehicle sunroof of FIG. 2 and show the example sunroof of FIG. 2 in an open state.

FIG. 3 is a view of the sunroof 200 and shows the sunroof 200 in the open state. When in the open state, the sunroof 200 substantially exposes the cabin of the vehicle 100 to an outside environment. For example, the fluid(s) may pass into the vehicle cabin through a first example opening 301 provided by the sunroof 200 due to the first panel 204 moving away from the first position thereof. In particular, the first panel 204 of the FIG. 3 is in the second position thereof. On the other hand, the second panel 206 of FIG. 3 is in the first position thereof. In some examples, when in the second position, the first panel 204 is aligned to the second panel 206 such that the first panel 204 covers substantially all of the second panel 206. In such examples, the first panel 204 includes a secondary end (e.g., an edge) 300 that is proximate to a primary end (e.g., an edge) 302 of the second panel 206. However, in some examples, the first panel 204 at least partially covers the second panel 206 when the first panel 204 is in the second position. In any case, the first and second panels 204, 206 are substantially parallel relative to the each other when the first panel 204 is in the second position thereof. That is, when the first and second panels 204, 206 are substantially parallel relative to each other, the first and second panel surfaces 210, 212 form and/or define an angle (e.g., between about −10 degrees and about 10 degrees).

Figure 4:
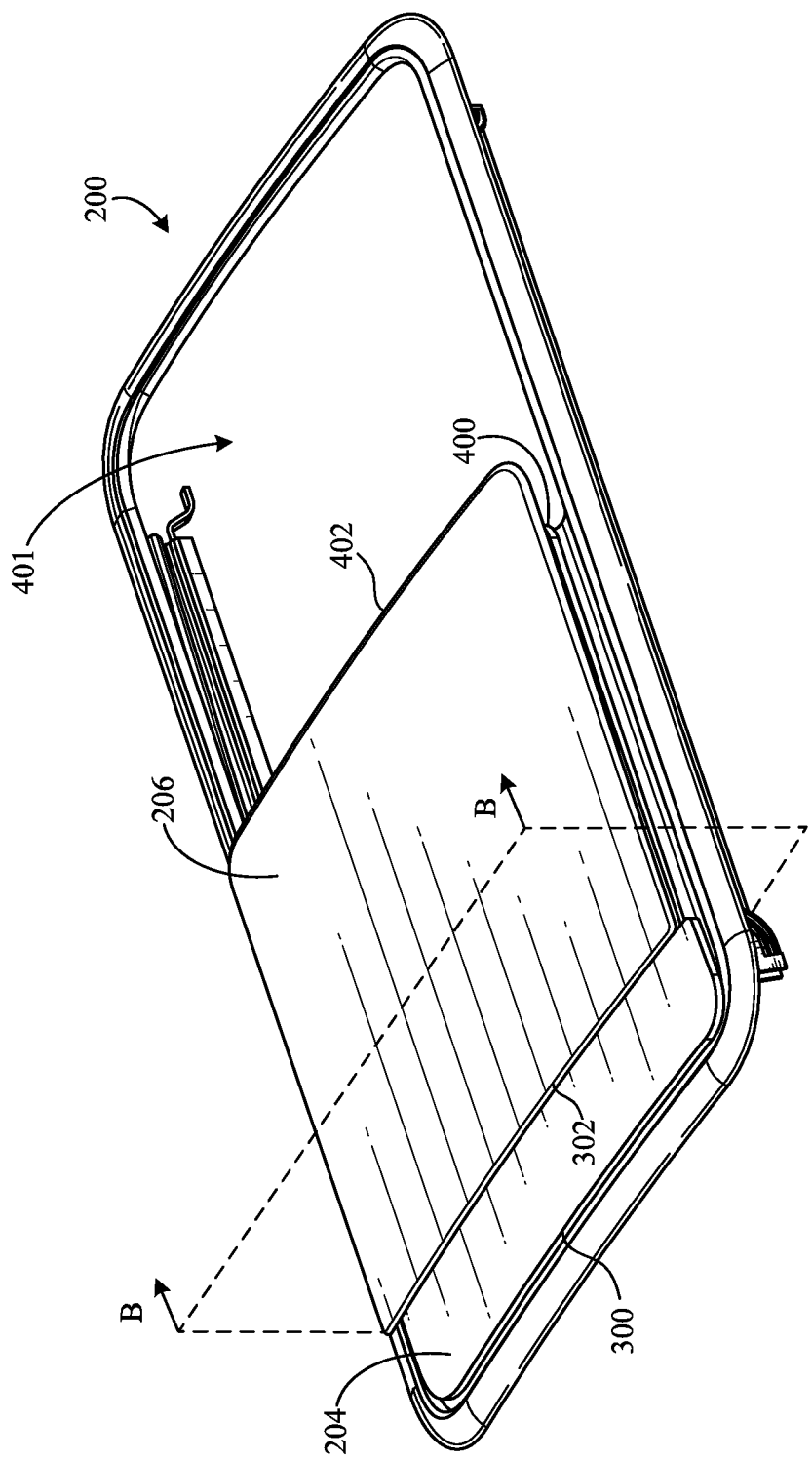

FIG. 4 is a view of the sunroof 200 and shows the sunroof 200 in the open state. As such, the sunroof 200 of FIG. 4 provides a second example opening 401 through which the fluid(s) may pass and enter the vehicle cabin due to the second panel 206 moving away from the first position thereof. In particular, the second panel 206 of FIG. 4 is in the second position thereof. On the other hand, the first panel 204 of FIG. 4 is in the first position thereof. In some examples, when in the second position, the second panel 206 is aligned to the first panel 204 such that the second panel 206 substantially covers all of the first panel 204. For example, the first panel 204 of FIG. 4 includes a primary end (e.g., an edge) 400 opposite the secondary end 300 of the first panel 204. Further, the second panel 206 of FIG. 4 includes a secondary end (e.g., an edge) 402 that is opposite the primary end 302 of the second panel 206. In such examples, the secondary end 402 of the second panel 206 is proximate to the primary end 400 of the first panel 204. However, in some examples, the second panel 206 at least partially covers the first panel 204 when the second panel 206 is in the second position. In any case, the first and second panels 204, 206 are substantially parallel relative to the each other when the second panel 206 is in the second position thereof.

Figure 5:
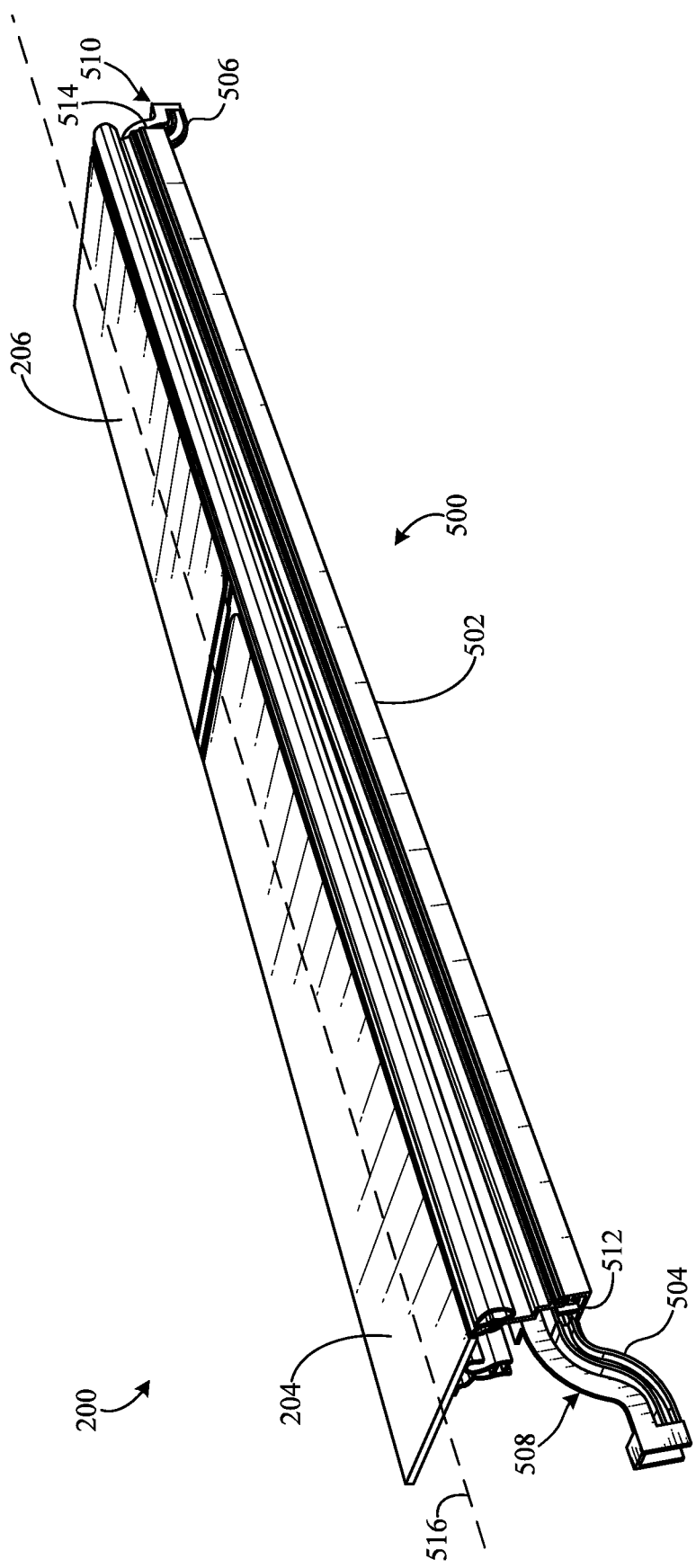
FIG. 5 is a partial-view of the example vehicle sunroof of FIG. 2 and shows an example guide system thereof in accordance with the teachings of this disclosure.

FIG. 5 is a detailed view of the sunroof 200 and shows an example guide system 500 thereof in accordance with the teachings of this disclosure. According to the illustrated example of FIG. 5, the guide system 500 of the sunroof 200 includes an example rail 502, a first example guide block (e.g., an end guide block) 504, and a second example guide block (e.g., an end guide block) 506. Additionally, the sunroof 200 of FIG. 5 also includes a first example bracket 508 supporting the first panel 204 and a second example panel bracket 510 supporting the second panel 206, which are sometimes referred to as panel brackets. Each of the first and second brackets 508, 510 of FIG. 5 is movable along and/or relative the rail 502 via the guide system 500. As will be discussed further below, the guide system 500 of FIG. 5 is operatively coupled to the first and second brackets 508, 510 and structured and/or configured to guide movement thereof. In particular, movement of the first bracket 508 of FIG. 5 along and/or relative to the rail 502 via the guide system 500 results in the first panel 204 moving between first and second positions thereof and/or otherwise positions the first panel 204 at least partially over the second panel 206. Similarly, in some examples, movement of the second bracket 510 of FIG. 5 along and/or relative to the rail 502 via the guide system 500 results in the second panel 204 moving between the first and second positions thereof and/or otherwise positions the second panel 206 at least partially over the first panel 204.

The rail 502 of FIG. 5 is interposed between the first and second guide blocks 504, 506 such that the rail 502 extends from the first guide block 504 to the second guide block 506. For example, as shown in FIG. 5, the first guide block 504 is positioned at or near a first end 512 of the rail 502. In such examples, the first guide block 504 is coupled (e.g., directly and/or via one or more intermediate components) to the rail 502, for example, via one or more example fasteners (e.g., adhesive, screw(s), stud(s), nut(s), etc.) and/or one or more fastening methods or techniques (e.g., snap-fitting). Additionally, as shown in FIG. 5, the second guide block 506 is positioned at or near a second end 514 of the rail 502 opposite the first end 512. In such examples, the second guide block 506 is coupled (e.g., directly and/or via one or more intermediate components) to the rail 502, for example, via one or more of the fasteners and/or one or more of the fastening methods or techniques.

The first bracket 508 of FIG. 5 is sized, shaped, structured, and/or otherwise configured to support the first panel 204. According to the illustrated example of FIG. 5, the first bracket 508 is coupled (e.g., directly and/or via one or more intermediate components) to the first panel 204, for example, via one or more example fasteners and/or one or more example fastening methods or techniques. As a result, the first panel 204 and the first bracket 508 move cooperatively and/or simultaneously. Additionally, the first bracket 508 is configured to slidably engage the rail 502 and/or the first guide block 504 to guide movement of the first bracket 508, for example, via one or more pins coupled to the first bracket 508.

Further, the second bracket 510 of FIG. 5 is sized, shaped, structured, and/or otherwise configured to support the second panel 206. According to the illustrated example of FIG. 5, the second bracket 510 is coupled (e.g., directly and/or via one or more intermediate components) to the second panel 206, for example, via one or more fasteners and/or one or more fastening methods or techniques. As a result, the second panel 206 and the second bracket 510 move cooperatively and/or simultaneously. Similar to the first bracket 508, the second bracket 510 is configured to slidably engage the rail 502 and/or the second guide block 506, for example, via one or more pins coupled to the second bracket 510.

Although FIG. 5 depicts the sunroof 200 having only one rail 502, two guide blocks 504, 506, and two brackets 508, 510, in some examples, the guide system 500 is implemented differently. For example, the sunroof 200 may include a third bracket (e.g., similar to first bracket 508) coupled to the first panel 204 opposite relative to the first bracket 508. Continuing with this example, the sunroof 200 may also include a fourth bracket (e.g., similar to the second bracket 510) coupled to the second panel 206 opposite relative to the second bracket 510. Further, in such examples, the guide system 500 may include a second rail (e.g., similar to the rail 502) and two end guide blocks positioned on opposite ends of the second rail that are configured to similarly guide movement of the third and fourth panel brackets. Thus, in some examples, the sunroof 200 includes two rails 502, four guide blocks 504, 506, and four brackets 508, 510. Accordingly, in some such examples, the sunroof 200 is considered to have an example symmetry axis 516 whereby the sunroof 200 and/or the components thereof is/are substantially the same or similar on each side of the symmetry axis 516. In this manner, the first and second panels 204, 206 are better supported. Additionally, movement of the brackets 508, 510 and, thus, the panels 204, 206 is better stabilized when opening and/or closing the sunroof 200, which improves sunroof performance and/or durability.

Figure 6:
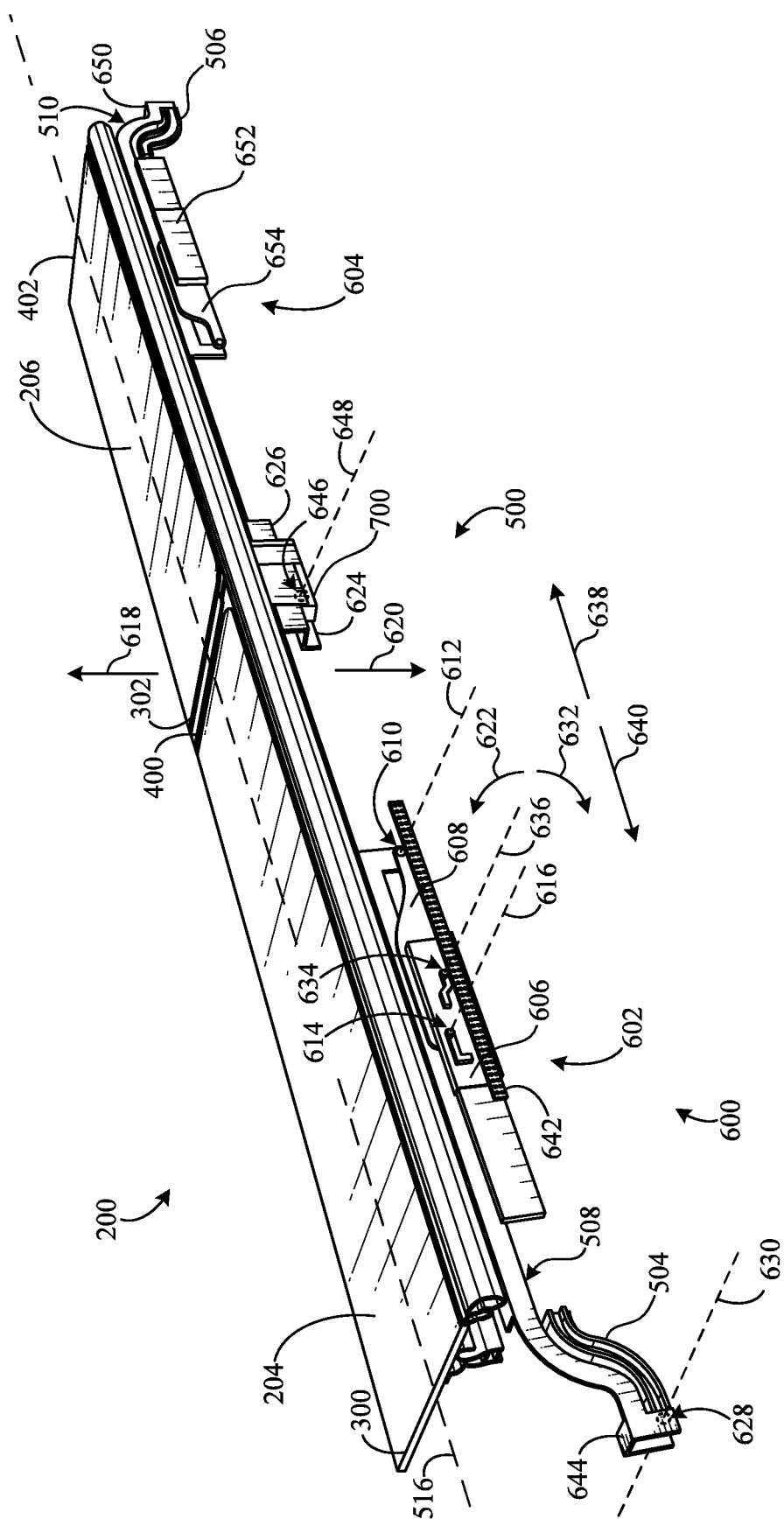
FIG. 6 is a partial exploded view of the example vehicle sunroof of FIG. 2 and shows an example actuator system in accordance with the teachings of this disclosure.

FIG. 6 is a partial exploded view of the sunroof 200 and shows an example actuator system 600 in accordance with the teachings of this disclosure. That is, the rail 502 has been removed for clarity. According to the illustrated example of FIG. 6, the actuator system 600 includes one or more (e.g., four) example actuators 602, 604, two of which are shown in this example (i.e., a first actuator 602 and a second actuator 604). In some examples, the actuator system 600 also includes one or more of the controller 102, the motor(s) 104, and/or the input device(s) 106. For example, each actuator 602, 604 may be associated with and/or operatively coupled to a respective one of the motor(s) 104 to receive output therefrom. However, in some examples, a single motor 104 is operatively coupled to the actuators 602, 604 to provide output thereto. In particular, the actuator system 600 is structured and/or configured to control movement (e.g., tilting, raising, sliding, lowering, etc.), via the guide system 500, of the first brackets 508 and/or the second bracket 510 and, thus, the first sunroof panel 204 and/or the second sunroof panel 206.

The first actuator 602 of FIG. 6 is operatively coupled to the first bracket 508 to control movement the first bracket 508 (i.e., control movement of the first panel 204) via the guide system 500 based on force(s) applied to one or more components the first actuator 602. In some examples, the first actuator 602 includes a first example movable shoe 606 (sometimes referred to a drive shoe) and a first example rotatable link 608 (sometimes referred to as a drive link) slidably coupled together, as shown in FIG. 6. That is, in such examples, the first shoe 606 is configured to move relative to and slide against the first link 608, thereby rotating the first link 608 relative to the first shoe 606. For example, when opening and/or closing the sunroof 200, the first shoe 606 is configured to slide through at least a portion (e.g., a channel) of the rail 502 such that the rail 502 guides movement of the first shoe 606 along the rail 502. In particular, a portion (e.g., the second end 1240 of FIG. 12) of the first link 608 is rotatably coupled to a portion (e.g., the third arm 954 of FIG. 9) of the first bracket 508, for example, via a first example movable joint (e.g., a pin joint) 610. Accordingly, the first actuator 602 includes the first joint 610 to enable the first link 608 and the first bracket 508 to rotate relative to each other. The first joint 610 of FIG. 6 is formed by one or more of the first link 608, the first bracket 508, and/or one or more other associated components (e.g., the fifth pin 948 of FIG. 9). As a result, each of the first link 608 and the first bracket 508 is rotatable relative to the first joint 610 and/or a first example axis 612 associated with the first joint 610. The first bracket 508, first shoe 606, and the first link 608 are sometimes referred to as a function assembly.

In some examples, to enable the first link 608 to rotate relative to the first shoe 606, the first actuator 602 also includes a second example movable joint (e.g., a pin joint) 614, which is sometimes referred to as a primary joint of the first actuator 602. The second joint 614 of FIG. 6 is formed by one or more of the first shoe 606, the first link 608, and/or one or more other associated components (e.g., the ninth pin 1204 of FIG. 12). In such examples, rotation of the first link 608 relative to the second joint 614 and/or a second example axis 616 associated with the second joint 614 causes the primary end 400 of the first panel 204 to move relative to the primary end 302 of the second panel 206, for example, in a first linear direction (e.g., a vertical direction) 618 and/or a second linear direction (e.g., a vertical direction) 620 opposite to the first linear direction 618.

For example, in response to the first link 608 rotating relative to the second joint 614 and/or the second axis 616 in a first rotational direction (e.g., counterclockwise) 622, the first link 608 imparts, via the first joint 610, a force or load on the portion of the first bracket 508, a component of which is at least partially directed in the first linear direction 618. As a result this force or load, a first end 624 of the first bracket 508 and the primary end 400 of the first panel 204 move in the first linear direction 618 (i.e., rise) relative to the primary end 302 of the second panel 206 and/or a first end 626 of the second bracket 510. In particular, in such examples, the first bracket 508 and the first panel 204 rotate in the first rotational direction 622 relative to a third example movable joint (e.g., a pin joint) 628 and/or a third example axis 630 associated with the third joint 628. That is, the first bracket 508 includes the third movable joint 628 operatively coupled thereto. In this manner, the first panel 204 moves from the first position to the intermediate position (e.g., a tilted position). The third joint 628 of FIG. 6 is formed by one or more of the first bracket 508, the first guide block 504, and/or one or more other associated components (e.g., the third pin 906 and/or the fourth pin 908 of FIG. 9), as discussed further below.

Conversely, as the first link 608 rotates relative to the second axis 616 in a second rotational direction (e.g., clockwise) 632 opposite the first rotational direction 622, the first end 624 of the first bracket 508 and the primary end 400 of the first panel 204 move in the second linear direction 620 (i.e., lower) relative to the primary end 302 of the second panel 206 and/or the first end 626 of the second bracket 510. In particular, in such examples, the first bracket 508 and the first panel 204 rotate relative to the third joint 628 and/or the third axis 630 in the second rotational direction 632. In this manner, the first panel 204 moves from the intermediate position to the first position.

Additionally, in some examples, the first actuator 602 also includes a fourth example movable joint (e.g., a pin joint) 634 to enable the first link 608 to further rotate relative to the first shoe 606, which is sometimes referred to as a secondary joint of the first actuator 602. The fourth joint 634 of FIG. 6 is formed by one or more of the first shoe 606, the first link 608, and/or one or more other associated components (e.g., the tenth pin 1206 of FIG. 12). In such examples, rotation of the first link 608 relative to the fourth joint 634 and/or a fourth example axis 636 associated with the fourth joint 634 allows the first guide block 504 to raise and/or lower the secondary end 300 of the first panel 204 via the first bracket 508.

On the other hand, unlike the first link 608, the first shoe 606 does not substantially rotate during operation of the sunroof 200. That is, the rail 502 is sized, shaped, structured, and/or otherwise configured to substantially prevent rotation of the first shoe 606. In particular, the first shoe 606 is moveable along the rail 502 in a third linear direction (e.g., a horizontal direction) 638 and/or a fourth linear direction (e.g., a horizontal direction) 640, opposite the third linear direction 638. In some examples, to facilitate controlling movement of the first shoe 606 and the first link 608 (e.g., via the motor(s) 104), the first actuator 602 also includes an example belt (e.g., a toothed belt) 642. The belt 642 of FIG. 6 is operatively interposed between and/or coupled to the first shoe 606 and at least one of the motor(s) 104. That is, the belt 642 extends from the first shoe 606 to the motor(s) 104 and is configured to transfer the output from the motor(s) 104 to the first shoe 606, thereby moving the first shoe 606 along the rail 502. For example, the belt 642 imparts a force on the first shoe 606 based on the output generated by the motor(s) 104. As a result of the first shoe 606 moving in the third linear direction 638 and/or the fourth linear direction 640, the first shoe 606 engages the first link 608, which causes the first link 608 to rotate and/or move along the rail 502 cooperatively with the first shoe 606. Although FIG. 6 depicts the belt 642, in some examples, the first actuator 602 includes one or more other coupling mechanisms (e.g., a cable or wire) in addition or alternatively to the belt 642 to similarly enable the motor(s) 104 to control movement of the first shoe 606. Further, in examples where the sunroof 200 does not include the motor(s) 104, a force may be similarly imparted on the first shoe 606, for example, by a user. Thus, in some examples, the sunroof 200 may be manually operated.

The first guide block 504 of FIG. 6 facilitates raising and/or lowering the secondary end 300 of the first panel 204. In particular, the first bracket 508 includes a second end 644, opposite the first end 624 of the first bracket 508, having at least a portion (e.g., the third pin 906 and/or the fourth pin 908 of FIG. 9) that is configured to slide through a portion (e.g., the third channel 800 and/or the fourth channel 802 of FIG. 8) of the first guide block 504. That is, the first guide block 504 slidably receives the portion of the first bracket 508 and guides movement thereof. In such examples, as the first bracket 508 moves in the third linear direction 638, the first guide block 504 causes the second end 644 of the first bracket 508 and the secondary end 300 of the first panel 204 to move in the first linear direction 618 (i.e., raise). For example, the first guide block 504 imparts, via the third joint 628, a force or load on the first bracket 508 having at least a component directed in the first linear direction 618. In this manner, the first panel 204 moves from the intermediate position to or toward the second position. Conversely, as the first bracket 508 moves in the fourth linear direction 640, the first guide block 504 causes the second end 644 of the first bracket 508 and the secondary end 300 of the first panel 204 to move in the second linear direction 620 (i.e., lower). For example, the first guide block 504 imparts, via the third joint 628, a force or load on the first bracket 508 having at least a component directed in the second linear direction 620. In this manner, the first panel 204 moves from the second position to or toward the intermediate position.

According to the illustrated example of FIG. 6, to enable such operation of the actuator system 600, the guide system 500 includes an example third guide block (e.g., a central or intermediate guide block) 700 that is operatively interposed between first and second brackets 510, 504 to guide movement thereof. As shown in FIG. 6, the third guide block 700 is at least partially positioned between the first end 624 of the first bracket 508 and the first end 626 of the second bracket 510, which are proximate to each other. In some examples, the third guide block 700 couples to a portion of the rail 502 such that the third guide block 700 does not move relative to the rail 502, for example, via one or more example fasteners and/or one or more example fastening methods or techniques. In particular, the third guide block 700 is sized, shaped, structured, and/or otherwise configured to apply a resistance to the first end of the 624 of the first bracket 508 and/or the first end 626 of the second bracket 510 during operation of the sunroof 200. As will be discussed further below, such resistance enables one or more of the actuator(s) 602, 604 to properly actuate to raise and/or lower the primary ends 400, 402.

In some examples, as the first shoe 606 moves in third linear direction 638, the third guide block 700 substantially and/or temporarily prevents the first end 624 of the first bracket 508 and the first link 608 from moving in the third linear direction 638. As a result, the third guide block 700 enables the first shoe 606 to move relative to (e.g., toward) and slidably engage the first link 608, which causes the first link 608 to rotate relative to the shoe 606 in the in the first rotational direction 622. Conversely, in some examples, as the first shoe 606 moves in the fourth linear direction 640, the third guide block 700 substantially and/or temporarily prevents the first end 624 of the first bracket 508 and the first link 608 from moving in the fourth linear direction 640. As a result, the third guide block 700 enables the first shoe 606 to move relative to (e.g., away from) the first link 608 and slidably engage the first link 608, which causes the first link 608 to rotate relative to the first shoe 606 in the second rotational direction 632.

In some examples, to enable the first guide block 504 to raise the secondary end 300 of the first panel 204, the first bracket 508 includes a fifth example movable joint 646 operatively coupled thereto and/or associated with the first end 624 of the first bracket 508. In particular, the first panel 204 and the first bracket 508 are rotatable relative to the fifth joint 646 and/or a fifth example axis 648 associated with the fifth joint 646. In some examples, the fifth joint 646 is formed by one or more of the first bracket 508, the third guide block 700, a portion (e.g., the second track 914 of FIG. 9) of the second bracket 510, and/or one or more other associated components (e.g. the first pin 704 of FIG. 7). In some such examples, the first axis 612, the second axis 616, the third axis 630, the fourth axis 636, and the fifth axis 648 are substantially parallel relative to each other.

Although FIG. 6 depicts aspects in connection with the first panel 204, the first guide block 504, the first bracket 508, the first actuator 602, and the third guide block 700, in some examples, such aspects likewise apply to one or more related and/or similar components of the sunroof 200 such as, for example, the second panel 206, one or more of the other brackets (e.g., the second bracket 510), one or more of the other guide blocks (e.g., the second guide block 506), and one or more of the other actuators (e.g., the second actuator 604). For example, the second guide block 506 facilitates moving a second end 650 of the second bracket 510, opposite the first end 626, and, thus, the secondary end 402 of the second panel 206 in the first linear direction 618 and/or the second linear direction 620. In particular, the second guide block 506 configured to raise and/or lower the secondary end 402 of the second panel 206 and the second end 650 of the second bracket 510 as the second bracket 510 moves relative to the second guide block 506. Further, in some examples, the second actuator 604 includes a second example movable shoe (e.g., similar to the first shoe 606) 652 and a second example rotatable link (e.g., similar to the first link 608) 654 slidably coupled to the second shoe 652.

Further still, as previously mentioned, in some examples, the sunroof 200 has the symmetry axis 516. In such examples, the actuator system 600 is substantially the same on each side of the symmetry axis 516. For example, the actuator system 600 includes a third actuator (e.g., similar to the first actuator 602) operatively coupled to the third bracket associated with the first panel and a fourth actuator (e.g., similar to the second actuator 604) operatively coupled to the fourth bracket associated with the second panel 206. In this manner, operation of the actuator system 600 may be improved. Additionally, the guide system 500 may include a fourth example guide block (e.g., similar to the third guide block 700) coupled to the second rail and configured to interact with the third and fourth brackets.

Figure 7A:
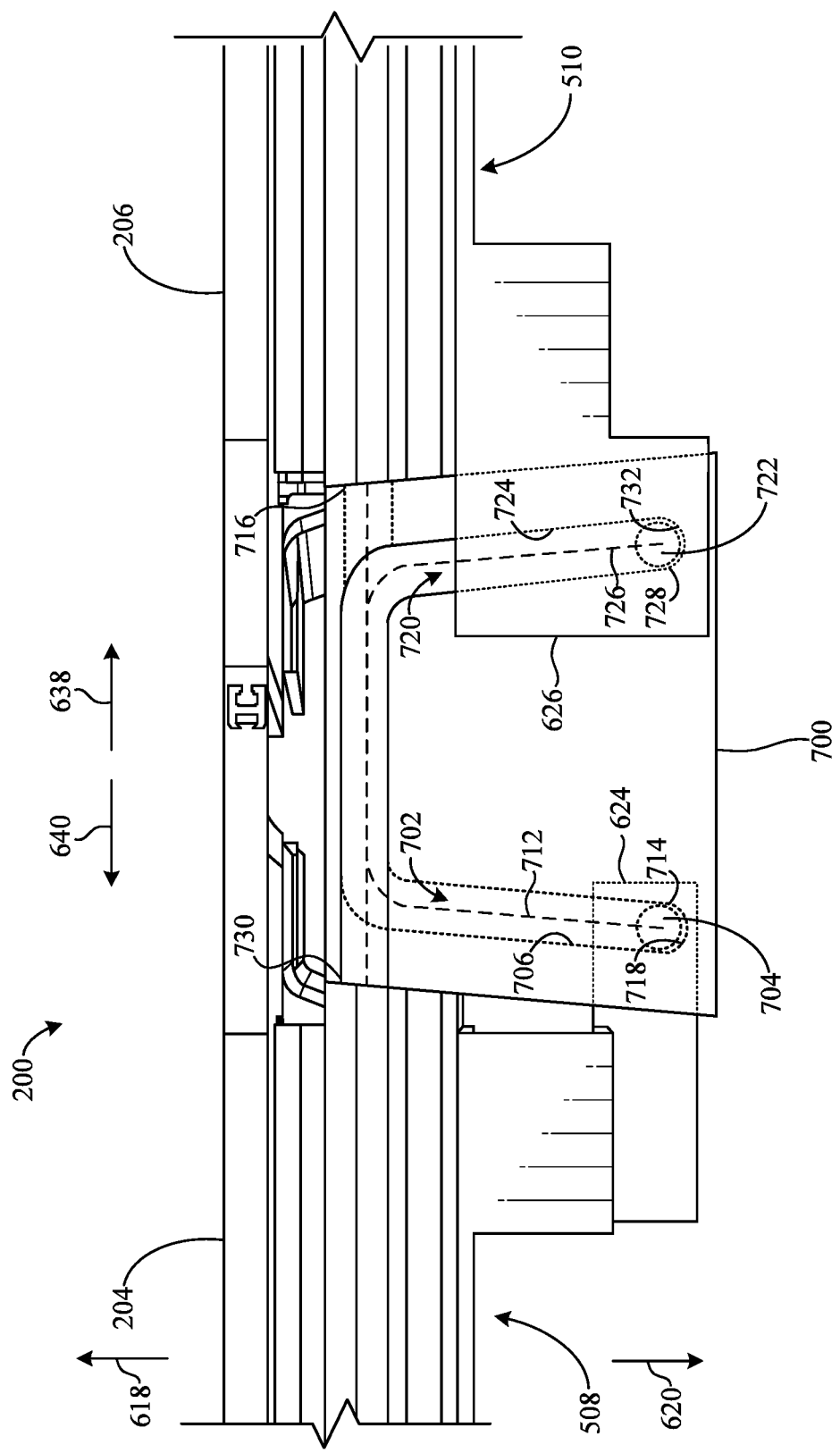
FIG. 7A is an enlarged partial-view of the example vehicle sunroof of FIG. 2 and shows an example guide block in accordance with the teachings of this disclosure.

FIG. 7A is an enlarged partial-view of the sunroof 200 and shows the third guide block 700. According to the illustrated example of FIG. 7A, the third guide block 700 is operatively interposed between the first and second brackets 508, 510, which facilitates raising and/or lowering the first end 624 of the first bracket 508 and/or the first end 626 of the second bracket 510 cooperative with the actuator(s) 602, 604, as previously mentioned. In particular, the third guide block 700 of FIG. 7A includes a first example channel 702 positioned thereon that is sized, shaped, structured, and/or otherwise configured to slidably receive a first example pin 704 and guide movement thereof. Stated differently, the third guide block 700 slidably receives the first pin 704 via the first channel 702. That is, as the first pin 704 moves through the first channel 702, the first pin 704 engages a first example surface (e.g., an inner surface) 706 of the third guide block 700 that forms and/or defines the first channel 702. As such, the first channel 702 of FIG. 7A provides a first example path 712 (represented by the dotted/dashed lines of FIG. 7) between a first end 714 of the first channel 702 and a second end 716 of the first channel 702, opposite the first end 714, along which the first pin 704 is to travel. In some examples, the first channel 702 guides the first pin 704 into a portion (e.g., the second track 914 of FIG. 9) of the second bracket 510 when the first pin 704 is moving through the first channel 702 along the first path 712 in the first linear direction 618 and/or the third linear direction 638.

The first pin 704 of FIG. 7A is coupled to the first bracket 508 at or near the first end 624 of the first bracket 508 such that first pin 704 transfers forces or loads to the first bracket 508, for example, via one or more fasteners and/or one or more fastening methods or techniques. As a result, movement of the first pin 704 corresponds to movement of the first bracket 508. Thus, the third guide block 700 guides, via the first channel 702 and the first pin 704, movement of the first panel 204 and/or the first bracket 508 when the first panel 204 is moving between the first position and the intermediate position thereof.

In some examples, the third guide block 700 also includes a first example travel stop 718 associated with the first channel 702, which limits movement of the first pin 704 in the second linear direction 620. For example, as the first pin 704 moves through the first channel 702 along the first path 712 in the second linear direction 620, the first pin 704 engages the first travel stop 718, thereby preventing the first pin 704 from moving further through the first channel 702 along the first path 712 in the second linear direction 620. In some examples, the first travel stop 718 is positioned at or near the first end 714 of the first channel 702, as shown in FIG. 7A. In such examples, the first travel stop 718 is formed and/or defined by at least a portion of the first surface 706 of the third guide block 700.

Additionally, in some examples, the third guide block 700 includes a second example channel 720 positioned thereon that is sized, shaped, structured, and/or otherwise configured to slidably receive a second example pin 722 and guide movement thereof. Stated differently, in such examples, the third guide block 700 slidably receives the second pin 722 via the second channel 720. That is, as the second pin 722 moves through the second channel 720, the second pin 722 engages a second example surface (e.g., an inner surface) 724 of the third guide block 700 that forms and/or defines the second channel 720. As such, the second channel 720 of FIG. 7A provides a second example path 726 (represented by the dotted/dashed lines of FIG. 7) between a first end 728 of the second channel 720 and a second end 730 of the second channel 720, opposite the first end 728, along which the second pin 722 is to travel. In some examples, the second channel 720 guides the second pin 722 into a portion (e.g., the first track 904 of FIG. 9) of the first bracket 508 when the second pin 722 is moving through the second channel 720 along the second path 726 in the first linear direction 618 and/or the fourth linear direction 640.

The second pin 722 of FIG. 7A is coupled to the second bracket 510 at or near the first end 626 of the second bracket 510 such that the second pin 722 transfers forces or loads to the second bracket 510, for example, via one or more fasteners and/or one or more fastening methods or techniques. As a result, movement of the second pin 722 corresponds to movement of the second bracket 510. Thus, the third guide block 700 guides, via the second channel 720 and the second pin 722, movement of the second bracket 510 and/or the second panel 206 when the second panel 206 is moving between the first position and the intermediate position.

In some examples, the third guide block 700 also includes a second example travel stop 732 associated with the second channel 720, which limits movement of the second pin 722 in the second linear direction 620. For example, as the second pin 722 moves through the second channel 720 along the second path 726 in the second linear direction 620, the second pin 722 engages the second travel stop 732, thereby preventing the second pin 722 from moving further through the second channel 720 along the second path 726 in the second linear direction 620. In some examples, the second travel stop 732 is positioned at or near the first end 728 of the second channel 720, as shown in FIG. 7A. In such examples, the second travel stop 732 is formed and/or defined by at least a portion of the second surface 724 of the third guide block 700.

Figure 7B:
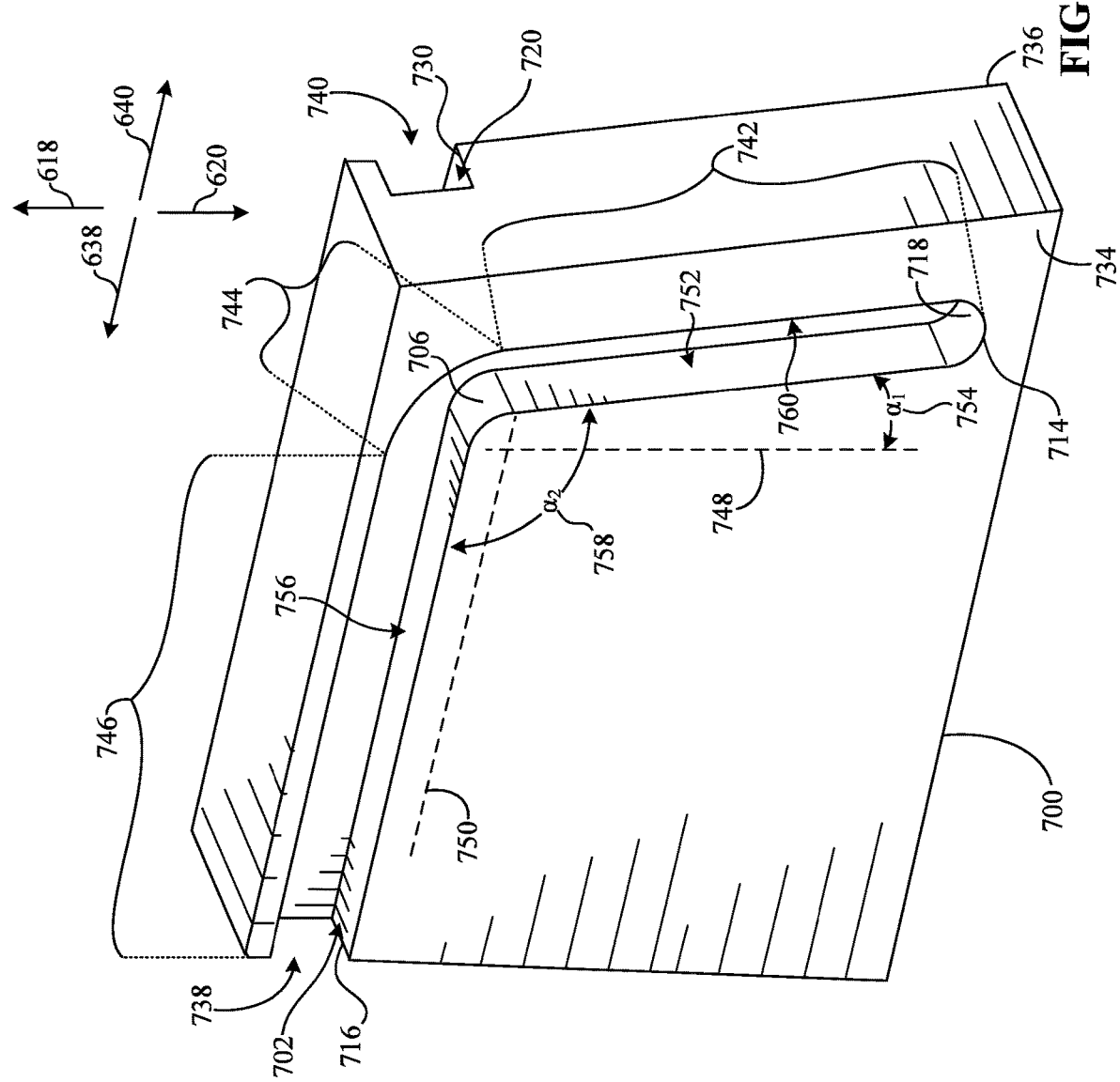
FIG. 7B is a detailed view of the example guide block of FIG. 7A.

FIG. 7B is a detailed view of the third guide block 700 of FIG. 7A. As shown in FIG. 7B, the first channel 702 is positioned on a first side 734 of the third guide block 700 and the second channel 720 is positioned on a second side 736 of the third guide block 700 opposite the first side 734. However, in other examples, the first and second channels 702, 720 are positioned on the third guide block 700 differently. In particular, to allow the first pin 704 to exit and/or enter the first channel 702, the third guide block 700 includes a first example aperture (e.g., an outlet and/or an inlet) 738 positioned thereon at or near the second end 716 of the first channel 702. For example, the first pin 704 moves through the first channel 702 from the first end 714 to the second end 716 and exits the first channel 702 via the first aperture 738. Additionally, in some examples, to similarly allow the second pin 722 to exit and/or enter the second channel 720, the third guide block 700 includes a second example aperture (e.g., an outlet and/or an inlet) 740 positioned thereon at or near the second end 730 of the second channel 720. For example, the second pin 722 moves through the second channel 720 from the first end 728 to the second end 730 and exits the second channel 720 via the second aperture 740.

In some examples, the first channel 702 includes multiple sections or portions 742, 744, 746 that are different relative to each other and connected together, three of which are shown in this example. In other words, according to the illustrated example of FIG. 7B, the first channel 702 has a first example portion (e.g., a substantially vertical portion) 742, a second example portion (e.g., a substantially curved portion) 744, and a third example portion (e.g., a substantially horizontal portion) 746 that connected together. In such examples, the first and third portions 742, 746 are substantially straight or linear. For example, the first portion 742 extends substantially along a vertical axis 748 (i.e., a vertical direction), and the third portion 746 extends substantially along a horizontal axis 750 (i.e., a horizontal direction). On the other hand, the second portion 744 is substantially curved. That is, the second portion 744 curves from the first portion 742 to the third portion 746 and/or otherwise connects the first and third portions 742, 746 together. As such, the second portion 744 guides movement of the first pin 704 between the first and third portions 742, 746 and/or otherwise causes the first pin 704 to change direction when moving through the first channel 702 between the first and third portions 742, 746.

In some examples, the first portion 742 of FIG. 7B is slightly sloped or angled relative to the vertical axis 748. In such examples, the vertical axis 748 and a first area 752 of the first surface 706 corresponding to the first portion 742 form and/or define a first example angle (e.g., about 20 degrees or less) 754. As such, the first portion 742 extends substantially along the vertical axis 748. On the other hand, in some examples, the horizontal axis 750 and a second area 756 of the first surface 706 corresponding to the third portion 746 are substantially parallel. That is, the horizontal axis 750 and the second area 756 form a second example angle (e.g., between about −10 degrees and about 10 degrees). As such, the third portion 746 extends substantially along the horizontal axis 750. Further, the first and second areas 752, 756 of the first surface 706 of the third guide block 700 form and/or define a third example angle 758 that is relatively large compared to the first angle 754 such as, for example, between about 80 degrees and about 100 degrees. As such, in this example, the first portion 742 is substantially perpendicular relative to the third portion 746.

As previously mentioned, in some examples, the third guide block 700 is configured to apply the resistance to the first end 624 of the first bracket 508 when opening and/or closing the sunroof 200 via the first actuator 602. In some such examples, the first actuator 602 urges the first pin 704 into engagement with the first area 752 (e.g., when opening the sunroof 200), which causes the first area 752 to impart a force or load (e.g., having at least a component directed in the fourth linear direction 640) on the first pin 704 to substantially prevent the first pin 704 from moving along the horizontal axis 750 (i.e., in a horizontal direction). That is, as the first pin 704 travels across the first portion 742 of the first channel 702, the first pin 704 travels in the third linear direction 638 by a relative small distance (e.g., about 6 inches or less). As a result of this force, the first actuator 602 is enabled to actuate and/or change from a first example state to a second example state, thereby moving the first pin 704 through the first channel 702 along the first path 712 from the first portion 742 of the first channel 702 to the third portion 746 of the first channel 702. For example, the first shoe 606 is enabled to move along the rail 502 relative to (e.g., toward) the link 608. In particular, in such examples, the third guide block 700 maintains such resistance and/or the force imparted on the first pin 704 until the first pin 704 exits the first portion 742 and passes into the second portion 744 and/or the third portion 746.

Further, in some examples, the first surface 706 of the third guide block 700 also includes a third area 760, opposite the first area 752, corresponding to the first portion 742 of the first channel 702 and/or at least a part of the second portion 744. In some such examples, the first actuator 602 urges the first pin 704 into engagement with the third area 760 (e.g., when closing the sunroof 200), which causes the third area 760 to impart a force or load (e.g., having at least a component directed in the third linear direction 638) on the first pin 704 to substantially prevent the first pin 704 from moving along the horizontal axis 750 (i.e., in a horizontal direction). That is, as the first pin 704 travels across the first portion 742 of the first channel 702, the first pin 704 travels in the fourth linear direction 640 by a relative small distance (e.g., about 6 inches or less). As a result of this force, the first actuator 602 is enabled to actuate and/or change from the second state to the first state, thereby moving the first pin 704 through the first channel 702 along the first path 712 to or toward the first travel stop 718. For example, first shoe 606 is enabled to move along the rail 502 relative to (e.g., away from) the first link 608.

In some examples, a weight associated with the first panel 204 and/or the first bracket 508 urges the first pin 704 into engagement with the second area 756 (e.g., when opening and/or closing the sunroof 200), which causes the second area 756 to impart a force or load (e.g., having at least a component directed in the first linear direction 618) on the first pin 704 to substantially prevent the first pin 704 from moving along the vertical axis 748 (i.e., in a vertical direction). That is, as the first pin 704 travels across the third portion 746 of the first channel 702, the first pin 704 travels in first linear direction 618 and/or the second linear direction 620 by a relatively small distance (e.g., about 6 inches or less).

Although FIG. 7B depicts aspects in connection with the first channel 702, in some examples, such aspects likewise apply to the second channel 720. For example, the second channel 720 may have a first example portion (e.g., similar to the first portion 742 of the first channel 702), a second example portion (e.g., similar to the second portion 744 of the first channel 702), and a third example portion (e.g., similar to the third portion 746 of the first channel 702) that are connected together.

Figure 8:
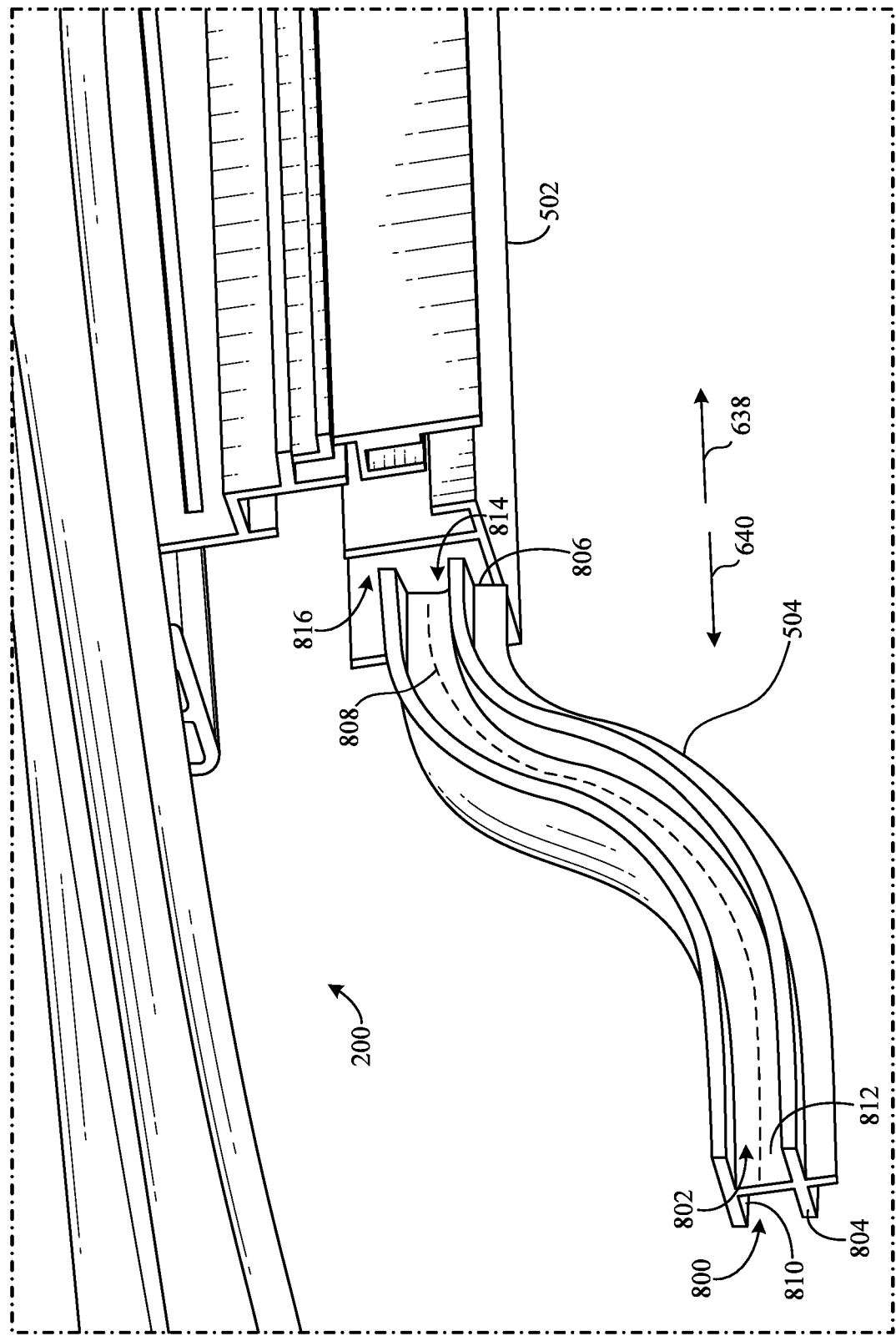
FIG. 8 is another enlarged partial-view of the example vehicle sunroof of FIG. 2 and shows another example guide block in accordance with the teachings of this disclosure.

FIG. 8 is an enlarged partial-view of the sunroof 200 and shows the first guide block 504. As previously mentioned, the first guide block 504 facilitates raising and/or lowering the second end 644 of the first bracket 508 and, thus, the secondary end 300 of the first panel 204 during sunroof operation. In particular, the first guide block 504 of FIG. 8 includes one or more example channels 800, 802 positioned thereon, two of which are shown in this example (i.e., a third channel 800 and a fourth channel 802). The third and fourth channels 800, 802 of FIG. 8 are sometimes referred to as a first pair of channels. In particular, the channel(s) 800, 802 of the first guide block 504 are sized, shaped, structured, and/or otherwise configured to slidably receive one or more respective pins and guide movement thereof such as, for example, the third and fourth pins 906, 908 of FIG. 9. In such examples, each of the channel(s) 800, 802 extend between a first end 804 of the first guide block 504 and a second end 806 of the first guide block 504, opposite the first end 804, to provide a third example path 808 along which a respective one of the pins 906, 908 is to travel. As shown in FIG. 8, the first guide block 504 includes a first example surface (e.g., an inner surface) 810 that forms and/or defines the third channel 800. Similarly, in some examples, the first guide block 504 also includes a second example surface (e.g., an inner surface) 812 that forms and/or defines the fourth channel 802.

In some examples, to allow the pin(s) 906, 908 to enter and/or exit the respective channel(s) 800, 802, the first guide block 504 has one or more example apertures (e.g., inlet(s) and/or outlet(s)) 814 positioned thereon at or near the second end 806 of the first guide block 504, one of which is shown in this example (i.e., a third aperture 814). For example, when opening the sunroof 200 via the first bracket 508, the third pin 906 moves through the third channel 800 along the path 808 in the third linear direction 638 from the first end 804 to the second end 806 and exits the third channel 800 channel via the respective one of the apertures 814. As a result, the third pin 906 passes into a space 816 of the rail 502. Further, the fourth pin 908 similarly moves through the fourth channel 802 along the path 808 in the third linear direction 638 from the first end 804 to the second end 806 and exits the fourth channel 802 channel via the respective one of the apertures 814. As a result, the fourth pin 908 passes into the space 816 of the rail 502. Conversely, when closing the sunroof 200 via the first bracket 508, the third pin 906 moves through the space 816 of the rail 502 in the fourth linear direction 640 and exits the space 816. As a result, the third pin 906 passes into the third channel 800 via the respective one of the apertures 814. Further, in such examples, the fourth pin 908 similarly moves through the space 816 of the rail 502 in the fourth linear direction 640 and exits the space 816. As a result, the fourth pin 908 passes into the fourth channel 802 via the respective one of the apertures 814.

In some examples, one or more of the third and fourth channels 800, 802, the third path 808, and/or, more generally, the third guide block 700 is/are substantially curved (e.g., s-shaped), as shown in FIG. 8. However, in some examples, one or more of the third and fourth channels 800, 802, the third path 808, and/or, more generally, the third guide block 700 is/are shaped differently.

Although FIG. 8 depicts aspects in connection with the first guide block 504, in some examples, such aspects likewise apply to one or more other guide blocks of the sunroof 200 such as, for example, the second guide block 506. As such, similar to the first guide block 506, the second guide block 506 facilitates raising and/or lowering the second end 650 of the second bracket 510 and, thus, the secondary end 402 of the second panel 206 during sunroof operation, for example, via one or more channels (e.g., a second pair of channels) positioned on the second guide block 506 that interact with one or more pins (e.g., the sixth pin 1004 and/or the seventh pin 1006 of FIG. 10) coupled to the second bracket 510.

Figure 9:
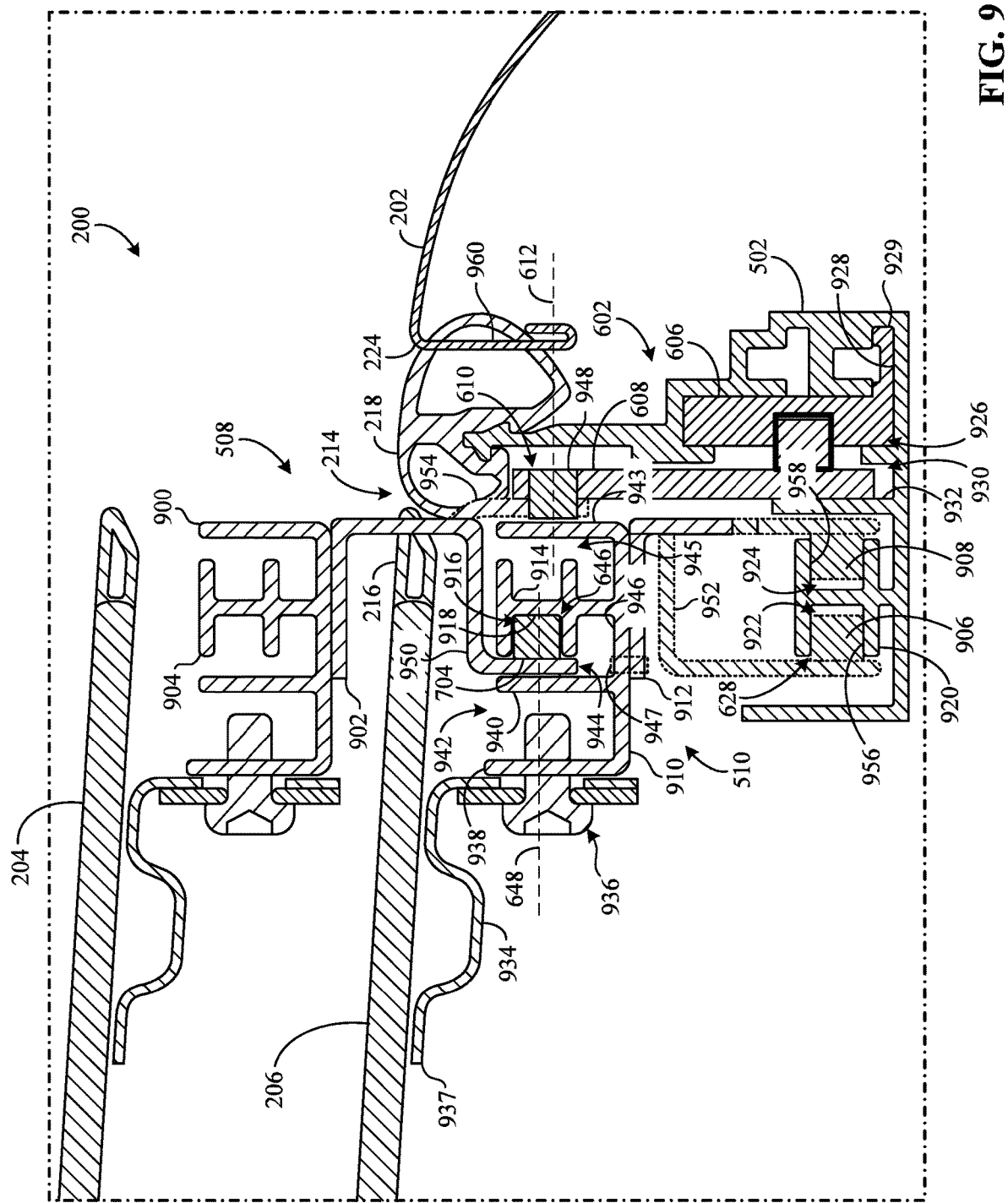
FIG. 9 is a cross-sectional view of the example vehicle sunroof of FIG. 3 along line A-A.

FIG. 9 is a cross-sectional view of the sunroof 200 of FIG. 3 along line A-A. As such, the first panel 204 of FIG. 9 is in the second position thereof, and the second panel 206 of FIG. 9 is in the first position thereof. According to the illustrated example of FIG. 9, the first bracket 508 includes a first example portion 900 and a second example portion 902 that are coupled together, for example, via one or more example fasteners and/or one or more example fastening methods or techniques (e.g., clinching or press-forming). In particular, the first portion 900 of the first bracket 508 includes a first example track 904 positioned thereon that is associated with guiding movement of the second pin 722. Additionally, the second portion 902 of the first bracket 508 includes the aforementioned third and fourth pins 906, 908 coupled thereto. Similarly, the second bracket 510 of FIG. 9 also includes a first example portion 910 and a second example portion 912 that are coupled together, for example, via one or more example fasteners and/or one or more example fastening methods or techniques (e.g., clinching or press-forming). In particular, the first portion 910 of the second bracket 510 includes a second example track 914 positioned thereon associated with guiding movement of the first pin 704.

According to the illustrated example of FIG. 9, the second bracket 510 includes at least a fifth example channel 916 positioned on the first portion 910 that is sized, shaped, structured, and/or otherwise configured to slidably receive the first pin 704 and guide movement thereof. In some examples, as the first pin 704 moves through the fifth channel 916, the first pin 704 engages a first surface (e.g., an inner surface) 918 of the second track 914 that forms and/or defines the fifth channel 916. That is, in such examples, the second track 914 forms and/or defines the fifth channel 916. In particular, the first channel 702 guides the first pin 704 therethrough and into the fifth channel 916 (i.e., into the second bracket 510) as the first panel 204 is moving over the second panel 206, for example, from the first position of the first panel 204 to or toward the intermediate position of the first panel 204. Conversely, in some examples, the fifth channel 916 guides the first pin 704 into the first channel 702 as the first panel 204 moves over the second panel 206, for example, from the intermediate position of the first panel 204 to or toward the first position of the first panel 204.

In some examples, to facilitate moving the panel(s) 204, 206 between the respective first second positions thereof, the rail 502 of FIG. 9 includes a third example track 920 positioned thereon that forms and/or defines one or more example channels 922, 924, two of which are shown in this example (i.e., a sixth channel 922 and a seventh channel 924). The sixth and seventh channels 922, 924 are sometimes referred to as a third pair of channels. In particular, the sixth and seventh channels 922, 924 are sized, shaped, structured, and/or otherwise configured to slidably receive one or more pins and guide movement thereof such as, for example, the first pair of pins 906, 908. The sixth and seventh channels 922, 924 of FIG. 9 extend at least partially across a length of the rail 502. In some examples, the sixth and seventh channels 922, 924 extend from the first end 512 of the rail 502 to the second end 514 of the rail 502. Further, in some examples, the rail 502 and the third track 920 are formed as a single-piece or integral component, for example, via one or more extrusion processes.

In some examples, the first pair of channels 800, 802 guides the first pair of pins 906, 908 therethrough and into the third pair of channels 922, 924 as the first panel 204 moves over the second panel 206, for example, from the intermediate position of the first panel 204 to or toward the second position of the first panel 204. Conversely, in some examples, the third pair of channels 922, 924 guides the first pair of pins 906, 908 therethrough and into the first pair of channels 800, 802 as the first panel 204 moves over the second panel 206, for example, from the second position of the first panel 204 to or toward the intermediate position of the first panel 204.

In some examples, to facilitate moving the first shoe 606 and/or the second shoe 652 along the rail 502, the rail 502 includes an example eighth channel 926 that extends at least partially across the length of the rail 502. In some examples, the eighth channel 926 extends from the first end 512 of the rail 502 to the second end 514 of the rail 502. In particular, the eighth channel 926 is sized, shaped, structured, and/or otherwise configured to slidably receive the first shoe 606 and/or the second shoe 652 such that the shoe(s) 606, 652 cannot rotate. For example, as the first shoe 606 moves through the eighth channel 926 in the third linear direction 638 and/or the fourth linear direction 640, the first shoe 606 engages a first example surface (e.g., an inner surface) 928 of the rail 502 that at least partially forms and/or defines the eighth channel 926. In this manner, the eighth channel 926 substantially maintains an orientation of the first shoe 606 relative to the rail 502 as the first shoe 606 moves therethrough. Additionally, in some examples, the first shoe 606 includes an example protrusion 929 positioned thereon, which better maintains the orientation of the first shoe 606 relative to the rail 502. In such examples, the protrusion 929 extends away from the first shoe 606 and into the rail 502 to slidably engage a greater area of the first surface 928.

Additionally, in some examples, to facilitate moving the first link 608 and/or the second link 654 along the rail 502, the rail 502 includes an example ninth channel 930 that extends at least partially across the length of the rail 502. In some examples, the ninth channel 930 extends from the first end 512 of the rail 502 to the second end 514 of the rail 502. In particular, the ninth channel 930 is sized, shaped, structured, and/or otherwise configured to slidably receive the first link 608 and/or the second link 654 such that the link(s) 608, 654 can at least partially rotate (e.g., relative to the second axis 616 and/or the fourth axis 636). For example, as the first link 608 moves through the ninth channel 930, the first link 608 engages a second example surface (e.g., an inner surface) 932 of the rail 502 that at least partially forms and/or defines the ninth channel 930.

In some examples, to facilitate supporting the second panel 206 via the first portion 910 of the second bracket 510, the sunroof 200 includes a fifth example bracket 934 coupled to and/or interposed between the second panel 206 and the first portion 910 of the second bracket 510. For example, as shown in FIG. 9, a first example fastener (e.g., one or more of a screw, a rivet, a stud, a bolt, a washer, a nut, etc.) 936 extends through the fifth bracket 934 and the first portion 910 of the second bracket 510, thereby coupling the fifth bracket 934 to the first portion 910. As shown in FIG. 9, the fifth bracket 934 extends from the second panel 206 to the first portion 910 of the second bracket 510. As such, the fifth bracket 934 of FIG. 9 is sized, shaped, structured, and/or otherwise configured to receive the second panel 206 and the first portion 910 of the second bracket 510. Further, in some examples, the fifth bracket 934 includes a portion 937 that curves away from the first fastener 936 and extends beneath and engages the second panel 206, which better supports the second panel 206.

In some examples, the first portion 910 of the second bracket 510 includes a first example wall 938 and a second example wall 940 spaced from the first wall 938. In such examples, the first wall 938 is configured to receive the first fastener 936, and the second wall 940 may slidably receive a side of the second portion 902 of the first bracket 508. In particular, the first portion 910 includes a first example gap or space 942 formed and/or defined by the first and second walls 938, 940 in which at least a portion of the first fastener 936 is positioned. As a result, the first space 942 provides access to the first fastener 936 (e.g., during assembly of the sunroof 200). In some examples, a user may position a tool (e.g., a wrench, a ratchet, etc.) in the first space 942 to interact with (e.g., tighten or loosen) the first fastener 936.

Further, in some examples, the first portion 910 of the second bracket 510 also includes a third example wall 943 spaced from the second wall 940. As shown in FIG. 9, the second track 914 is positioned between the second and third walls 940, 943. In particular, in such examples, the first portion 910 of the second bracket 510 includes a second example space 944 that is formed and/or defined by the second wall 940 and the second track 914, which facilitates coupling the first and second portions 910, 912 together. As shown in FIG. 9, the second portion 902 of the first bracket 508 is at least partially positioned in the second space 944. Additionally or alternatively, in some examples, the first portion 910 of the first bracket 508 includes a third example space 945 formed and/or defined by the third wall 943 and the first track 904, which similarly facilitates coupling the first and second portions 910, 912 together. More particularly, in such examples, the second space 944 and/or the third space 945 provide access to respective surfaces (e.g., inner surface(s)) 946 of the first portion 910 associated with coupling the first and second portions 910, 912 together.

As previously mentioned, the first and second portions 910, 912 of the second bracket 510 may be coupled together via one or more clinching or press-forming methods or techniques. In such examples, one or more tools (e.g., a press or punch, a die, etc.) associated with such method(s) or technique(s) interact with area(s) of the respective surface(s) 946 (e.g., impart a force or load on the area(s)), thereby coupling the first and second portions 910, 912 together. As a result, in some examples, the second bracket 510 includes one or more example non-movable or fixed joints (e.g., one or more clinched joints such as circular joint(s), rectangular joint(s), etc.) 947 that are at least partially positioned within the second space 944 and/or the third space 945, one of which is shown in this example (as represented by the dotted/dashed lines of FIG. 9). In such examples, the joint(s) 947 of the second bracket 510 couple the first and second portions 910, 912 together. For example, the surface(s) 946 of the first portion 910 and a surface (e.g., an outer surface) of the second portion 912 engaging the first portion 910 form and/or define the joint(s) 947. Further, in some examples, at least some of the joint(s) 947 extend partially into the second space 944 and/or the third space 945. Further still, in some examples, at least some of the joint(s) 947 extend into the respective surface(s) 946 such that recessed area(s) is/are formed on the respective surface(s) 946.

In some examples, the first actuator 602 includes a fifth example pin 948 that at least partially forms and/or defines the first joint 610 and the first axis 612. In such examples, the fifth pin 948 extends through the first link 608 and the second portion 902 of the first bracket 508, thereby rotatably coupling the first link 608 to the second portion 902 of the first bracket 508. Additionally, in some examples, the first pin 704 and one or both of the first channel 702 and/or the fifth channel 916 form the fifth joint 646 and the fifth axis 648 (e.g., when the first pin 704 is positioned within the first channel 702 and/or the fifth channel 916). For example, the first pin 704 extends toward the third guide block 700 and at least partially into the first channel 702 when the first panel 204 is in the intermediate position, thereby rotatably coupling the second portion 902 of the first bracket 508 to the third guide block. Similarly, in another example, the first pin 704 extends toward the second track 914 and at least partially into the fifth channel 916 when the first panel 204 is in the intermediate position or the second position, thereby rotatably coupling the second portion 902 of the first bracket 508 to the second track 914.

In some examples, to facilitate properly positioning and/or orienting the first, third, fourth, and fifth pins 704, 906, 908, 948, the second portion 902 includes one or more example arms 950, 952, 954 positioned thereon, three of which are shown in this example. That is, the second portion 902 of FIG. 9 includes a first arm 950, a second arm 952, and a third arm 954, as discussed further below in connection with FIG. 11. As shown in FIG. 9, the first arm 950 extends into the second space 944 between the second wall 940 and the second track 914. In particular, in such examples, the first pin 704 is positioned on and/or coupled to the first arm 950. Further, the third and fourth pins 906, 908 are positioned on and/or coupled to the second arm 952. Further still, the fifth pin 948 is positioned on and/or coupled to the third arm 954.

In some examples, when opening the sunroof 200 via the first bracket 508, the guide system 500 guides movement of the first pair of pins 906, 908 between the first guide block 504 and the third track 920. That is, the first pair of channels 800, 802 of the first guide block 504 guide the first pair of pins 906, 908 therethrough and into the third pair of channels 922, 924 of the third track 920 (i.e., into a portion of the rail 502). In such examples, the third pin 906 slidably engages the first surface 810 of the first guide block 504. For example, as the third pin 906 begins moving through the third channel 800 in the third linear direction 638 (e.g., when the first panel 204 is in the intermediate position), the first surface 810 of the first guide block 504 imparts a force (e.g., having a component directed in the first linear direction 618) on the third pin 906, thereby causing the third pin 906 to move in the first linear direction 618 and/or along the third path 808. As a result of this force, the second end 644 of the first bracket 508 and secondary end 300 of the first panel 204 move in the first linear direction 618 (i.e., rise) such that the first panel 204 moves from the intermediate position toward the second position. In this manner, the first guide block 504 facilitates raising the secondary end 300 of the first panel 204 via the third channel 800 and the third pin 906. Additionally, as the third pin 906 continues moving through the third channel 800 in the third linear direction 638, the third pin 906 exits, via a respective one of the apertures 814 positioned on the first guide block 504, the third channel 800 and passes into the sixth channel 922 of the third track 920 (i.e., passes into a portion of the rail 502).

Further, in some such examples, the fourth pin 908 slidably engages the second surface 812 of the first guide block 504 when opening the sunroof 200 via the first bracket 508, similar to the third pin 906. For example, as the fourth pin 908 begins moving through the third channel 800 in the third linear direction 638 (e.g., when the first panel 204 is in the intermediate position), the second surface 812 of the first guide block 504 imparts a force (e.g., having a component directed in the first linear direction 618) on the fourth pin 908, thereby causing the fourth pin 908 to move in the first linear direction 618 and/or along the third path 808. As a result of this force, the second end 644 of the first bracket 508 and secondary end 300 of the first panel 204 move in the first linear direction 618 (i.e., rise) such that the first panel 204 moves from the intermediate position toward the second position. In this manner, the first guide block 504 facilitates raising the secondary end 300 of the first panel 204 via the fourth channel 802 and the fourth pin 908. Additionally, as the third pin 906 continues moving through the third channel 800 in the third linear direction 638, the third pin 906 exits, via the ones of the apertures 814 positioned on the first guide block 504 at or near the second end 806 thereof, the third channel 800 and passes into the seventh channel 924 of the third track 920 (i.e., passes into a portion of the rail 502).

Conversely, when closing the sunroof 200 via the first bracket 508, the guide system 500 guides movement of the first pair of pins 906, 908 between the third track 920 and the first guide block 504. That is, the third pair of channels 922, 924 of the third track 920 guide the first pair of pins 906, 908 therethrough and into the first pair of channels 800, 802 of the first guide block 504. In particular, the third pin 906 slidably engages a first example surface 956 of the third track 920 that forms and/or defines the sixth channel 922. For example, as the third pin 906 begins moving through the sixth channel 922 in the fourth linear direction 640 (e.g., when the first panel 204 is in the second position), the first surface 956 of the third track 920 imparts a force (e.g., having a component directed in the first linear direction 618) on the third pin 906, thereby causing the third pin 906 to move along a path (e.g., a straight or linear path) provided by the sixth channel 922. In such examples, when the third pin 906 is positioned in the sixth channel 922, the first and second panels 204, 206 are substantially parallel to each other (i.e., the first panel 204 is not in the intermediate position). In this manner, the third track 920 facilitates sliding the first bracket 508 along the rail 502 and, thus, moving the first panel 204 between the second position and the intermediate position. Additionally, as the third pin 906 continues moving through the sixth channel 922 in the fourth linear direction 640, the third pin 906 exits, via an aperture positioned on the third track 920 at or near an end of the third track 920, the sixth channel 922 and passes into the third channel 800 of the first guide block 504 (i.e., passes into a portion of the first guide block 504).

Further, in some such examples, the fourth pin 908 slidably engages a second example surface 958 of the third track 920 that forms and/or defines the seventh channel 924, similar to the third pin 906. For example, as the fourth pin 908 begins moving through the seventh channel 924 in the fourth linear direction 640 (e.g., when the first panel 204 is in the second position), the second surface 958 of the third track 920 imparts a force (e.g., having a component directed in the first linear direction 618) on the fourth pin 908, thereby causing the fourth pin 908 to move along a path (e.g., a straight or linear path) provided by the seventh channel 924. In such examples, when the fourth pin 908 is positioned in the seventh channel 924, the first and second panels 204, 206 are substantially parallel to each other (i.e., the first panel 204 is not in the intermediate position). In this manner, the third track 920 facilitates sliding the first bracket 508 along the rail 502 and, thus, moving the first panel 204 between the second position and the intermediate position. Additionally, as the fourth pin 908 continues moving through the seventh channel 924 in the fourth linear direction 640, the fourth pin 908 exits, via a second aperture positioned on the third track 920 at or near the end thereof, the seventh channel 924 and passes into the fourth channel 802 of the first guide block 504 (i.e., passes into a portion of the first guide block 504).

Although FIG. 9 depicts the two pins 906, 908 of the first bracket 508, in some examples, a single pin 906, 908 is used to implement the first bracket 508. Accordingly, in such examples, a single channel 800, 802 is used to implement the first guide block 504. However, using both pins 906, 908 and both channels 800, 802 may improve performance of the sunroof 200 compared to a single pin and channel by increasing stability of the first bracket 508 when opening and/or closing the sunroof 200. For example, strength and/or a loading capacity of the third joint 628 are improved by using the first pair of pins 906, 908.

In some examples, the second sunroof seal 218 is at least partially positioned within the aperture 214 of the vehicle roof 202, as shown in FIG. 9. In such examples, the second sunroof seal 218 is operatively interposed between the first sunroof seal 216 and the vehicle roof 202. In particular, the second sunroof seal 218 sealingly engages the first sunroof seal 216 and a portion 960 of the roof 202 at or near the perimeter or edge 224 of the roof 202.

Figure 10:
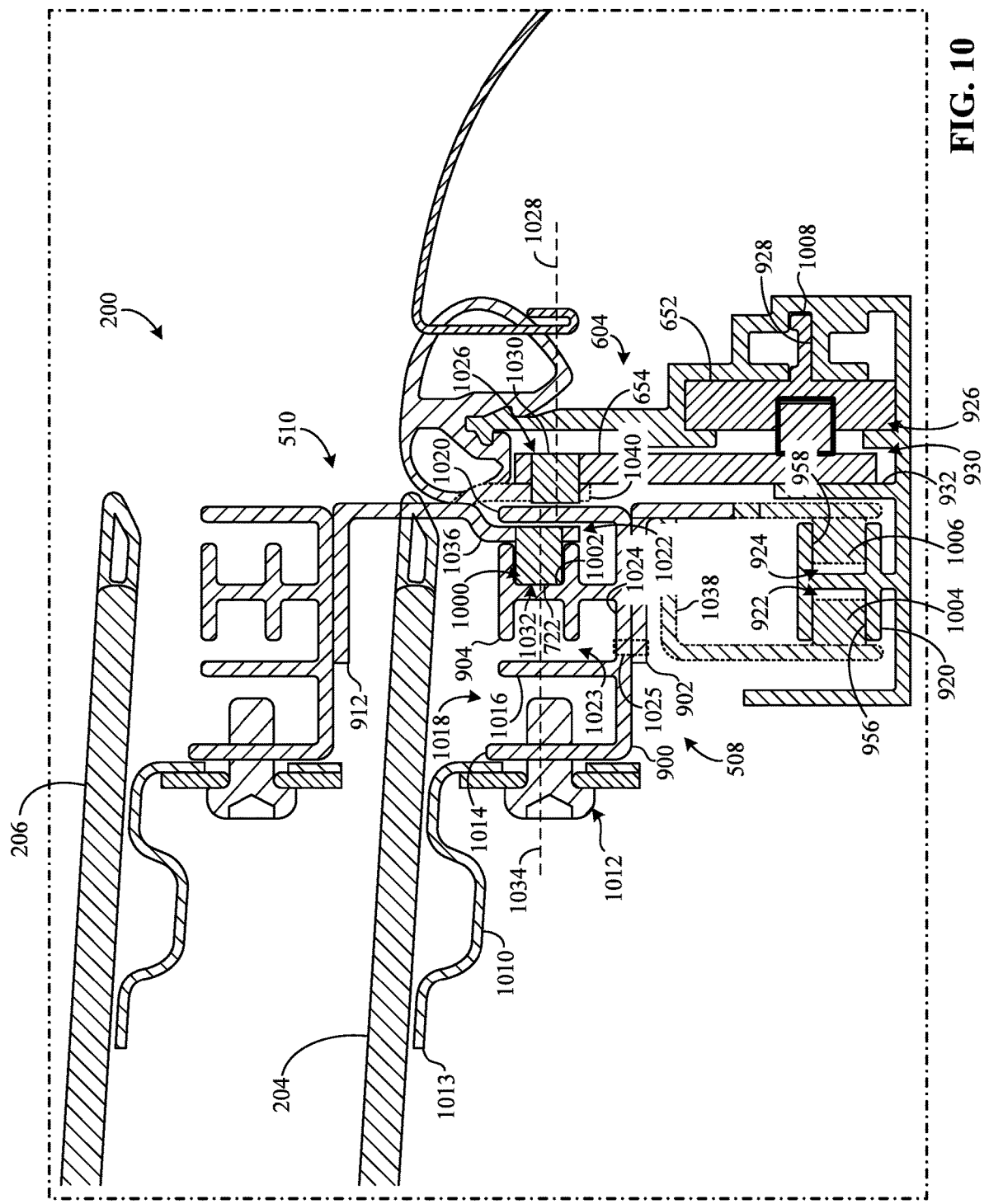
FIG. 10 is a cross-sectional view of the example vehicle sunroof of FIG. 4 along line B-B.

FIG. 10 is a cross-sectional view of the sunroof 200 of FIG. 4 along line B-B. As such, the first panel 204 of FIG. 10 is in the first position thereof, and the second panel 206 of FIG. 10 is in the second position thereof. According to the illustrated example of FIG. 10, the first bracket 508 includes at least a tenth example channel 1000 positioned on the first portion 900 that is sized, shaped, structured, and/or otherwise configured to slidably receive the second pin 722 and guide movement thereof. In some examples, as the second pin 722 moves through the tenth channel 1000, the second pin 722 engages a first surface (e.g., an inner surface) 1002 of the first track 904 that forms and/or defines the tenth channel 1000. That is, in such examples, the first track 904 forms and/or defines the tenth channel 1000. In particular, the second channel 720 of the third guide block 700 guides the second pin 722 therethrough and into the tenth channel 1000 as the second panel 206 is moving over the first panel 204, for example, from the first position of the second panel 206 to or toward the intermediate position of the second panel 206. Conversely, in some examples, the tenth channel 1000 guides the second pin 722 into the second channel 720 as the second panel 206 is moving over the first panel 204, from the intermediate position of the second panel 206 to or toward the first position of the second panel 206.

According to the illustrated example of FIG. 10, the second bracket 510 includes one or more example pins 1004, 1006 positioned thereon, two of which are shown in this example (i.e., a sixth pin 1004 and a seventh pin 1006). The sixth and seventh pins 1004, 1006 are sometimes referred to as a second pair of pins. The sixth and seventh pins 1004, 1006 of FIG. 10 are coupled to the second portion 912 of the second bracket 510, for example, via one or more example fasteners and/or one or more fastening methods or techniques. In particular, the sixth pin 1004 and/or the seventh pin 1006 is/are configured to slide through the second guide block 506 and the third track 920, similar to the first pair of pins 906, 908. In some examples, the second guide block 506 guides (e.g., via a pair of channels similar to the first pair of channels 800, 802) the second pair of pins 1004, 1006 therethrough and into the third pair of channels 922, 924 as the second panel 206 is moving over the first panel 204, for example, from the intermediate position of the second panel 206 to or toward the second position of the second panel 206. Conversely, in some examples, the third pair of channels 922, 924 guides the second pair of pins 1004, 1006 therethrough and into at least a portion of the second guide block 506 as the second panel 206 is moving over the first panel 204, for example, from the intermediate position of the second panel 206 to or toward the first position of the second panel 206.

According to the illustrated example of FIG. 10, the second shoe 652 is slidably disposed within the eighth channel 926. In such examples, as the second shoe 652 moves through the eighth channel 926 in the third linear direction 638 and/or the fourth linear direction 640, the first shoe 606 engages at least an area of the first surface 928 of the rail 502, thereby maintaining an orientation of the first shoe 606 relative to the rail 502. Additionally, in some examples, the second shoe 652 includes an example protrusion 1008 positioned thereon, which better maintains the orientation of the second shoe 652. In such examples, the protrusion 1008 extends away from the second shoe 652 and into the rail 502 to engage an area of the first surface 928.

Accordingly to the illustrated example of FIG. 10, the second link 654 is slidably disposed in the ninth channel 930 of the rail 502. In such examples, as the second link 654 moves through the ninth channel 930, the second link 654 engages at least an area of the second surface 932 of the rail 502. In particular, the second link 654 is configured to at least partially rotate within the rail 502 in response to the second shoe 652 slidably engaging the second link 654, similar to the first shoe 606 and the first link 608.

In some examples, to facilitate supporting the first panel 204 via the first portion 900 of the first bracket 508, the sunroof 200 includes a sixth example bracket 1010 coupled to and/or interposed between the first panel 204 and the first portion 900. For example, as shown in FIG. 10, a second example fastener (e.g., one or more of a screw, a rivet, a stud, a bolt, a washer, a nut, etc.) 1012 extends through the sixth bracket 1010 and the first portion 900 of the first bracket 508, thereby coupling the sixth bracket 1010 to the first portion 900. As shown in FIG. 10, the sixth bracket 1010 extends from the first panel 204 to the first portion 900 of the first bracket 508. As such, the sixth bracket 1010 of FIG. 10 is sized, shaped, structured, and/or otherwise configured to receive the first panel 204 and the first portion 900 of the first bracket 508. Further, in some examples, the sixth bracket 1010 includes a portion 1013 that curves away from the second fastener 1012 and extends beneath and engages the first panel 204, which better supports the first panel 204.

In some examples, the first portion 900 of the first bracket 508 includes a first example wall 1014 and a second example wall 1016 spaced from the first wall 1014. In such examples, the first wall 1014 is configured to receive the second fastener 1012. In particular, in such examples, the first portion 900 of the first bracket 508 includes a first example space 1018 formed and/or defined by the first and second walls 1014, 1016 within in which at least a portion of the second fastener 1012 is positioned. As a result, the first space 1018 provides access to the second fastener 1012 (e.g., during assembly of the sunroof 200). In some examples, a user may position a tool (e.g., a wrench, a ratchet, etc.) in the third gap 1018 to interact with (e.g., tighten or loosen) the second fastener 1012.

Further, in some examples, the first portion 900 of the first bracket 508 also includes a third example wall 1020 spaced from second wall 1016. As shown in FIG. 10, the first track 904 is positioned between the second and third walls 1016, 1020. In particular, in such examples, the first portion 900 of first bracket 508 includes a second example space 1022 formed and/or defined by the third wall 1020 and the first track 904 within which the second portion 912 of the second bracket 510 is at least partially positioned in this example. As such, the second portion 912 of the second bracket 510 may slidably engage the third wall 1020. Additionally or alternatively, in some examples, the first bracket 508 includes a third example space 1023 formed and/or defined by the second wall 1016 and the first track 904. More particularly, in some such examples, the second space 1022 and/or the third space 1023 provides access to example surface(s) (e.g., inner surface(s)) 1024 of the first portion 900 of the first bracket 508 associated with coupling the first and second portions 900, 902 together. As previously mentioned, the first and second portions 900, 902 of the first bracket 508 may be coupled together via one or more clinching or press-forming methods or techniques. In such examples, one or more tools (e.g., a press or punch, a die, etc.) associated with such method(s) or technique(s) interact with area(s) of the respective surface(s) 1024 (e.g., impart a force or load on the area(s)), thereby coupling the first and second portions 900, 902 together. As a result, in some examples, the first bracket 508 includes one or more example non-movable or fixed joints (e.g., one or more clinched joints such as circular joint(s), rectangular joint(s), etc.) 1025 that are at least partially positioned within the second space 1022 and/or the third space 1023, one of which is shown in this example (as represented by the dotted/dashed lines of FIG. 10). In such examples, the joint(s) 1025 of the first bracket 508 couple the first and second portions 900, 902 together. For example, the surface(s) 1024 of the first portion 900 and a surface (e.g., an outer surface) of the second portion 902 engaging the first portion 900 form and/or define the joint(s) 1025. Further, in some examples, at least some of the joint(s) 1025 extend partially into the second space 1022 and/or the third space 1023. Further still, in some examples, at least some of the joint(s) 1025 extend into the respective surface(s) 1024 such that recessed areas is/are formed on the respective surface(s) 1024.

In some examples, to allow the second link 654 to rotate relative to the second portion 912, the second actuator 604 includes a sixth example movable joint (e.g., similar to the first joint 610) 1026. That is, the second link 654 is rotatably coupled to the second portion 912 of the second bracket 510 via sixth joint 1026. In particular, the second link 654 is rotatable relative to the sixth joint 1026 and/or a sixth example axis 1028 associated with the sixth joint 1026, for example, in the first rotational direction 622 and/or the second rotational direction 632. In such examples, the sunroof 200 includes an eighth example pin 1030 that at least partially forms and/or defines the sixth joint 1026 and the sixth axis 1028. In such examples, the eighth pin 1030 extends through the second link 654 and the second portion 912 of the second bracket 510, thereby rotatably coupling the second link 654 to the second portion 912.

Additionally, in some examples, the second pin 722 and one or both of the second channel 720 and/or the tenth channel 1000 form a seventh example movable joint (e.g., similar to the fifth joint 646) 1032, for example, when the second pin 722 is positioned within the second channel 720 and/or the tenth channel 1000. That is, the second end 650 of the second bracket 510 is rotatable relative to the seventh joint 1032 and/or a seventh example axis 1034 associated with the seventh joint 1032, for example, in the first rotational direction 622 and/or the second rotational direction 632. In some examples, the second pin 722 extends toward the third guide block 700 and at least partially into the second channel 720, thereby rotatably coupling the second portion 912 of the second bracket 510 to the third guide block 700. Additionally, in some examples, the second pin 722 extends toward to the first track 904 and at least partially into the tenth channel 1000, thereby rotatably coupling the second portion 912 of the second bracket 510 to the first track 904.

In some examples, to facilitate properly positioning and/or orienting the second, sixth, seventh, and eighth pins 722, 1004, 1006, 1030, the second portion 912 of the second bracket 510 includes one or more example arms 1036, 1038, 1040, three of which are shown in this example. That is, the second portion 912 of FIG. 10 includes a first arm 1036 (e.g., similar to the first arm 950 of the first bracket 508), a second arm 1038 (e.g., similar to the second arm 952 of the first bracket 508), and a third arm 1040 (e.g., similar to the third arm 954 of the first bracket 508), each of which extends away from the second portion 912 to receive a respective one of the pins 722, 1004, 1006, 1030. As shown in FIG. 10, the first arm 1036 extends into the second space 1022 between the first track 904 and the third wall 1020. In particular, in such examples, the second pin 722 is positioned on and/or coupled to the first arm 1036, for example, at or near an end of the first arm 1036. Further, the sixth and seventh pins 1004, 1006 are positioned on and/or coupled to the second arm 1038, for example, at or near an end of the second arm 1038. Further, the eighth pin 1030 is positioned on and/or coupled to the third arm 1040, for example, at or near an end of the third arm 1040.

Figure 11:
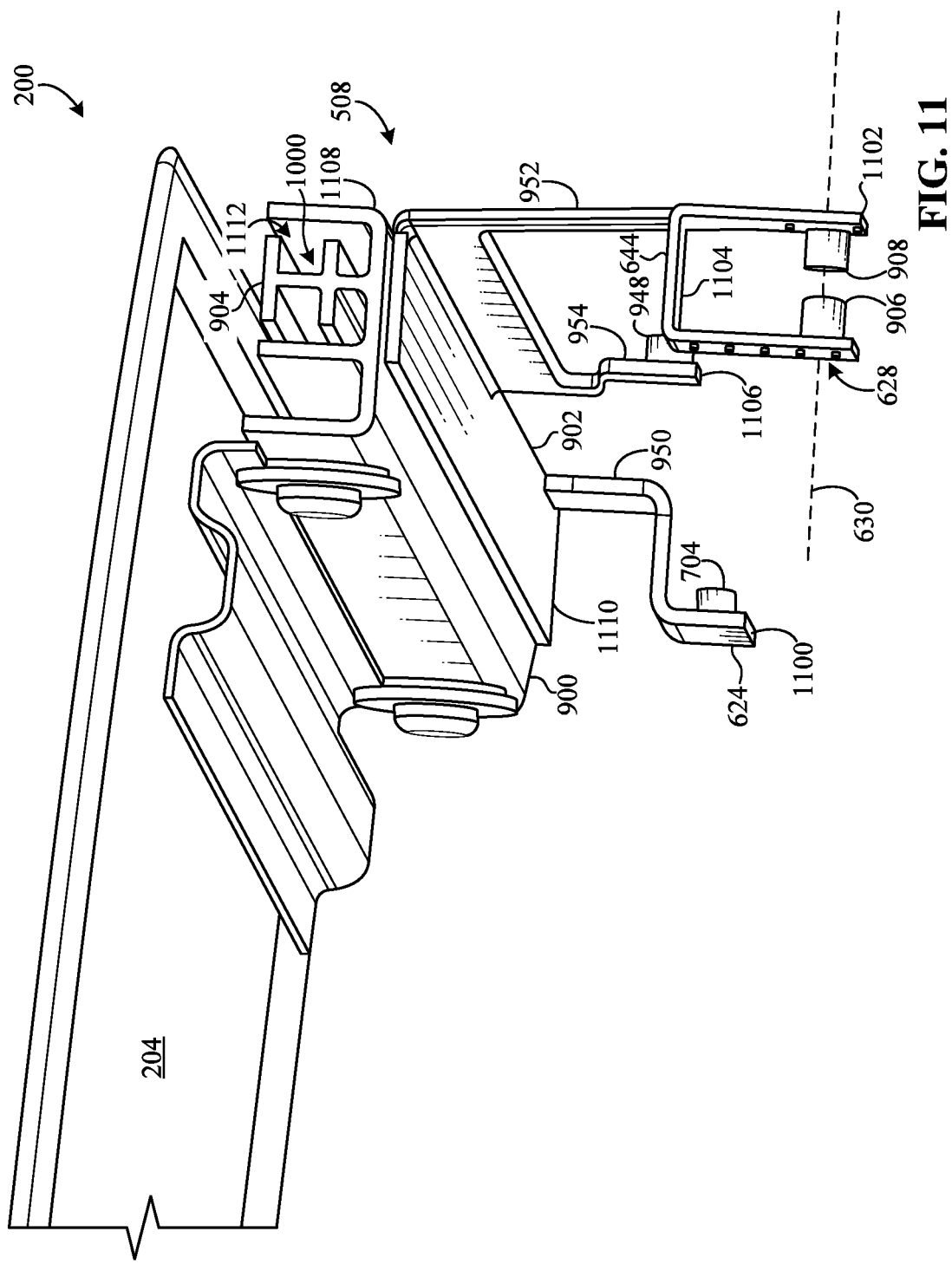
FIG. 11 is a partial-view of the example vehicle sunroof of FIG. 2 and shows an example bracket in accordance with the teachings of this disclosure.

FIG. 11 is a partial-view of the sunroof 200 and shows the first bracket 508. In some examples, the first portion 900 (e.g., including the first track 904) is formed as single-piece or integral component, for example, via one or more extrusion processes. In such examples, the first portion 900 is constructed of and/or includes a first material (e.g., aluminum) having advantageous properties associated with sliding pin(s) therethrough. On the other hand, the second portion 902 is constructed of and/or includes a second material (e.g., steel) different than the first material. In particular, in such examples, the second material is stronger and/or more rigid relative to the first material, which provides improved support to the first panel 204 and/or otherwise improves performance of the first bracket 508.

As shown in FIG. 11, the first pin 704 is positioned on the first arm 950, for example, at or near an end 1100 of the first arm 950. As such, the first arm 950 extends away from the second portion 902 to receive the first pin 704. In particular, the first arm 950 is sized and/or shaped such that the first pin 704 extends at least partially into the first channel 702 of the third guide block 700 when the first panel 204 is in one of the first position, the intermediate position, or a positioned between the first and intermediate positions. In some examples, the first arm 950 defines the first end 624 of the first bracket 508, as shown in FIG. 11.

As shown in FIG. 11, the third and fourth pins 906, 908 are positioned on the second arm 952, for example, at or near an end 1102 of the second arm 952. As such, the second arm 952 extends away from the second portion 902 to receive the third and fourth pins 906, 908. In particular, the second arm 952 is sized and/or shaped such that each of the third and fourth pins 906, 908 extends at least partially into: (1) a respective one of the third or fourth channel 800, 802 of the first guide block 504 when the first panel 204 is in one of the first position, the intermediate position, or a position between the first and intermediate positions; and (2) a respective one of the sixth or seventh channel 922, 924 of the third track 920 when the first panel 204 is in one of the second position, the intermediate position, or a position between the second and intermediate position. In some examples, the second arm 952 defines the second end 644 of the first bracket 508, as shown in FIG. 11.

In some examples, the second arm 952 includes a U-shaped portion 1104 positioned thereon at or near the end 1102, which facilitates properly positioning and/or orienting the third and fourth pins 906, 908. As such, the third and fourth pins 906, 908 of FIG. 11 are positioned on and/or coupled to the U-shape portion 1104 such that the third and fourth pins 906, 908 face each other. In some such examples, the second arm 952 forms and/or defines the U-shaped portion 1104 such that the second arm 952 and the U-shaped portion 1104 are a single-piece or integral component. As shown in FIG. 11, the fifth pin 948 is positioned on the third arm 954, for example, at or near an end 1106 of the third arm 954. As such, the third arm 952 extends away from the second portion 902 to receive the fifth pin 948.

According to the illustrated example of FIG. 11, the first pair of pins 906, 908 and the first guide block 504 form and/or define the third joint 628 and the third axis 630 when the first panel 204 is in one of the first position, the intermediate position, or a position between the first and intermediate positions. In particular, the third and fourth pins 906, 908 are configured to extend at least partially into the respective third and fourth channels 800, 802 of the first guide block 504, thereby rotatably coupling the second portion 902 to the first guide block 504 while the third and fourth pins 906, 908 remain positioned in the first guide block 504. Additionally, in this manner, the second pair of pins 1004, 1006 and second guide block 506 form and/or define an example moveable joint (e.g., similar to the third joint 628) when the second panel 206 is in one of the first position, the intermediate position, or a position between the first and intermediate position.

In some examples, each of the first track 904 and the tenth channel 1000 extend from a first end 1108 of the first portion 900 to a second end 1110 of the first portion 900 opposite the first end 1108. Further, in some examples, to allow the second pin 722 to enter and/or exit the tenth channel 1000, the first bracket 508 includes an example aperture (e.g., an inlet and/or an outlet) 1112 positioned thereon at or near the first end 1108. Although FIG. 11 depicts aspects in connection with the first bracket 508, in some examples, such aspects likewise apply to the second bracket 510.

Figure 12:
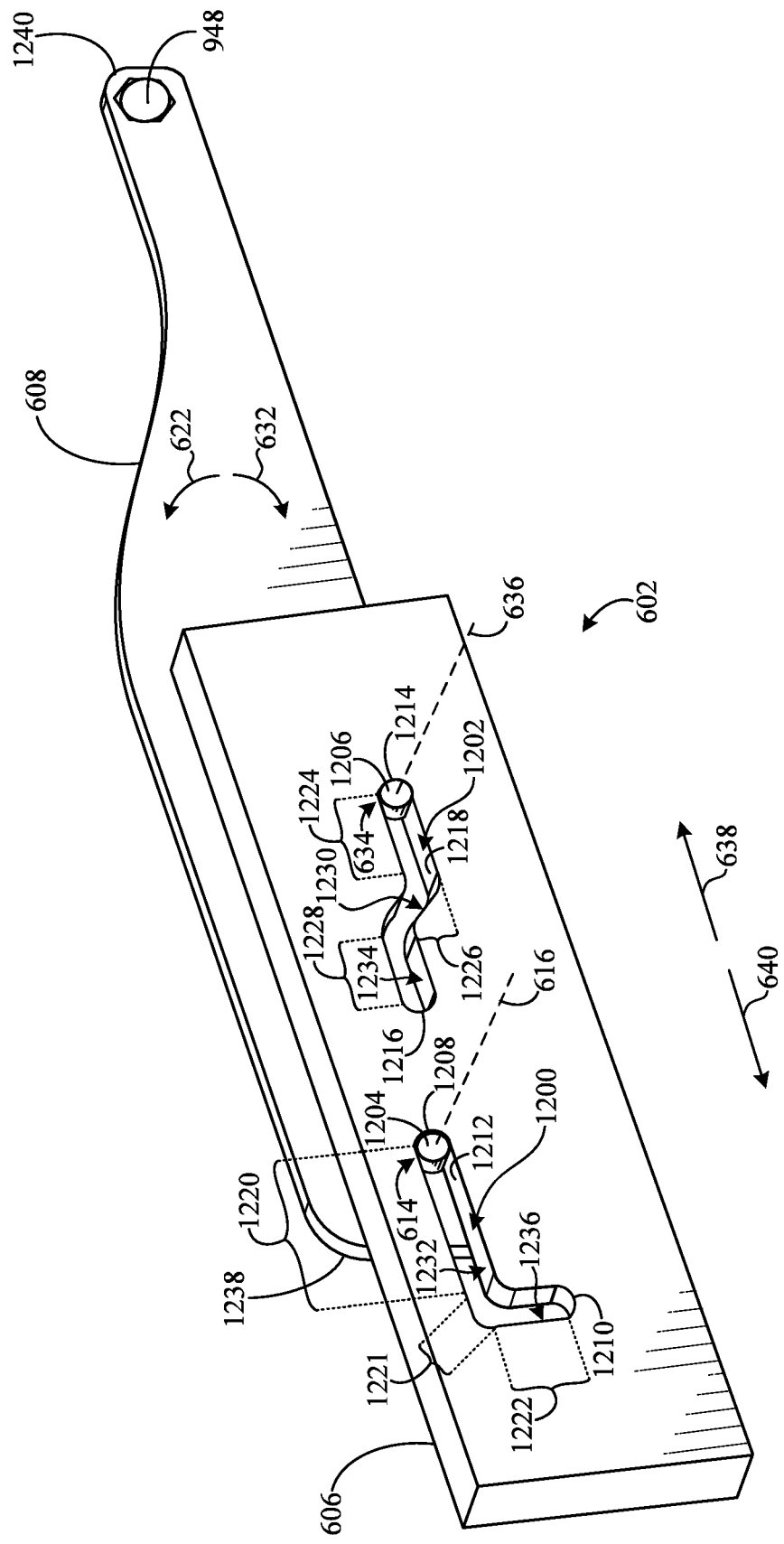
FIG. 12 is an enlarged partial-view of the sunroof 200 of FIG. 2 and shows an example actuator in accordance with the teachings of this disclosure.

FIG. 12 is an enlarged partial-view of the sunroof 200 and shows the first actuator 602. According to the illustrated example of FIG. 12, the first shoe 606 includes one or more example channels 1200, 1202 positioned thereon, two of which are shown in this example (i.e., an eleventh channel 1200 and a twelfth channel 1202). Further, the first link 608 of FIG. 12 includes one or more example pins 1204, 1206 coupled thereto that are spaced from each other, two of which are shown in this example (i.e., a ninth pin 1204 and a tenth pin 1206). In particular, the first and second channels 1200, 1202 are sized, shaped, structured, and/or otherwise configured to slidably receive the respective ninth and tenth pins 1204, 1206 and guide movement thereof. For example, as the ninth pin 1204 move through the eleventh channel 1200 between a first and second ends 1208, 1210 of the eleventh channel 1200, the ninth pin 1204 engages a first example surface (e.g., an inner surface) 1212 of the first shoe 606 that forms and/or defines the eleventh channel 1200. Further, in some examples, as the tenth pin 1206 moves through the twelfth channel 1202 between first and second ends 1214, 1216 of the twelfth channel 1202, the tenth pin 1206 engages a second example surface (e.g., an inner surface) 1218 of the first shoe 606 that forms and/or defines the twelfth channel 1202.

According to the illustrated example of FIG. 12, the first link 608 rotates relative to the first shoe 606 in the first or second rotational direction 622, 632 in response to the first shoe 606 moving relative to the first link 608 in the respective third or fourth linear direction 638, 640, which changes the state of the first actuator 602. In some examples, to facilitate such rotation of the first link 608, the eleventh channel 1200 includes one or more example portions 1220, 1221, 1222 that are connected together, three of which are shown in this example. Stated differently, the eleventh channel 1200 of FIG. 12 includes a first portion 1220, a second portion 1221, and a third portion 1222 that are connected together. For example, the second portion 1221 is interposed between the first and third portions 1220, 1222 and configured to connect the first and third portions 1220, 1222 together. In particular, the first and third portions 1220, 1222 of the eleventh channel 1200 are substantially straight or linear. For example, the first portion 1220 extends substantially in a horizontal direction (e.g., the third linear direction 638 and/or the fourth linear direction 640), and the third portion 1222 extends substantially in a vertical direction (e.g., the first linear direction 618 and/or the second linear direction 620). On the other hand, the second portion 1221 is substantially sloped, angled, and/or curved relative to the first and third portions 1220, 1222, which allows the ninth pin 1204 to change direction when moving from the first portion 1220 to the third portion 1222 and vice versa (e.g., when the first link 608 rotates relative to the fourth axis 636).

Further, the twelfth channel 1202 similarly includes one or more example portions 1224, 1226, 1228 that are connected together, three of which are shown in this example. Stated differently, the twelfth channel 1202 of FIG. 12 includes a first example portion 1224, a second example portion 1226, and a third example portion 1228 that are connected together. For example, the second portion 1226 is interposed between the first and third portions 1224, 1228 and configured to connect first and third portions together. In particular, the first and third portions 1224, 1228 of the twelfth channel 1202 are substantially straight or linear. For example, each of the first and third portions 1224, 1228 extends substantially in the horizontal direction, for example, such that the first portion 1220 of the eleventh channel 1200 and the first and third portions 1224, 1228 of the twelfth channel 1202 are substantially parallel. On the other hand, the second portion 1226 of the twelfth channel 1202 is sloped, angled, and/or curved relative to first and third portions 1224, 1228, which allows the tenth pin 1206 to change direction when moving from the first portion 1224 to the third portion 1228 and vice versa (e.g., when the first link 608 rotates relative to the second axis 616). As such, the twelfth channel 1202 of FIG. 12 is Z-shaped. However, in some examples, the twelfth channel 1202 is sized and/or shaped differently.

As shown in FIG. 12, the first shoe 606 is in a first position relative to the first link 608 whereby the ninth pin 1204 is positioned at or near the first end 1208 of the eleventh channel 1200 and the tenth pin 1206 is positioned at or near the first end 1214 of the twelfth channel 1202. As such, the first actuator 602 of FIG. 12 is in the first state thereof, which corresponds to the first position of the first panel 204. That is, when the first actuator 602 is in the first state thereof, the first panel 204 is in the first position thereof. As such, the first link 608 of FIG. 12 is also in a first position (e.g., a lowered position).

As the first shoe 606 moves relative to the first link 608 in the third linear direction 638 away from the first position of the first shoe 606, the tenth pin 1206 exits the first portion 1224 of the twelfth channel 1202 and passes into the second portion 1226 of the twelfth channel 1202. In this manner, the first shoe 606 moves from the first position to a second position relative to the first link 608. In such examples, when the tenth pin 1206 is in the first or second portion 1224, 1226 of the twelfth channel 1202, the ninth pin 1204 remains in the first portion 1220 of the eleventh channel 1200. In particular, the tenth pin 1206 engages a first example area (e.g., an upper area and/or a lower area) 1230 of the second surface 1218 that corresponds to the second portion 1226 of the twelfth channel 1202. As a result, this first area 1230 of the second surface 1218 imparts a force (e.g., having a component directed in the first linear direction 618) on the tenth pin 1206, thereby causing the first link 608 to rotate relative to the second axis 616. In this manner, the first actuator 602 changes from the first state to the second state. In particular, to allow such movement of the first shoe 606 relative to the first link 608, the third guide block 700 applies the resistance to the first bracket 508, as previously mentioned.

Further, in such examples, the ninth pin 1204 slidably engages a first example area (e.g., an upper area and/or a lower area) 1232 of the first surface 1212 that correspond(s) to the first portion 1220 of the eleventh channel 1200. That is, the first area 1232 of the first surface 1212 imparts a force on the ninth pin 1204, thereby allowing the first link 608 to rotate relative to the second axis 616. Thus, in such examples, the eleventh channel 1200 and the ninth pin 1204 form and/or define the second joint 614. Additionally, the ninth pin 1204 maintains engagement with the first area 1232 while the tenth pin 1206 remains in the second portion 1226 of the twelfth channel 1202, which allows the first link 608 to rotate relative to the second axis 616 in the first rotational direction 622 by a sufficient amount. In this manner, the first link 608 rotates from the first position to a second or intermediate position (e.g., a partially tilted position), which provides the second state of the first actuator 602 corresponding to the intermediate position of the first panel 204. That is, when the first actuator 602 is in the second state, the first panel 204 is in the intermediate position.

Further, as the first shoe 606 continues moving relative to the first link 608 in the third linear direction 638, the tenth pin 1206 exits the second portion 1226 of the twelfth channel 1202 and passes into the third portion 1228 of the twelfth channel 1202. In this manner, the first shoe 606 moves from the second position to a third position relative to the first link 608. In particular, in such examples, the ninth pin 1204 exits the first portion 1220 of the eleventh channel 1200 and enters the third portion 1222 via the second portion 1221 in response to the secondary end 300 of the first panel 204 rotating relative to the fifth axis 648, which allows the first link 608 to further rotate in the first rotational direction 622. As a result, the first actuator 602 changes from the second state to a third state. Further, in such examples, the tenth pin 1206 slidably engages a second example area (e.g., an upper area and/or a lower area) 1234 of the second surface 1218 that corresponds to the third portion 1228 of the twelfth channel 1202. That is, this second area 1234 of the second surface 1218 imparts a force or load on the tenth pin 1206, thereby allowing the first link 608 to rotate relative to the fourth axis 636. Thus, in such examples, the twelfth channel 1202 and the tenth pin 1206 form and/or define the fourth joint 634.

Additionally, in some examples, the tenth pin 1206 maintains engagement with the second area 1234 of the second surface 1218 while the ninth pin 1204 moves through the third portion 1226 of the twelfth channel 1202, which allows the first link 608 to rotate relative to the fourth axis 636 in the first rotational direction 622 by a sufficient amount to provide the third state of the first actuator 602. In this manner, the first link 608 rotates from the second or intermediate position to a third position (e.g., a fully tilted position).

Further, in some examples, when the first shoe 606 is in the third position relative to the first link 608, the ninth pin 1204 is positioned at or near the second end 1210 of the eleventh channel 1200 and the tenth pin 1206 is positioned at or near the second end 1216 of the twelfth channel 1202. In such examples, the ninth pin 1204 engages second example area 1236 of the first surface 1212 corresponding to the third portion 1222 of the eleventh channel 1200. Additionally or alternatively, in such examples, the tenth pin 1206 similarly engages an area of the second surface 1218 that corresponds to the second end 1216 of the twelfth channel 1202. As a result, the first shoe 606 and the first link 608 are enabled to move in the third linear direction 638 cooperatively (i.e., the first link 608 does not further rotate). In particular, as the first shoe 606 and the first link 608 move cooperatively in the third linear direction 638, an orientation of the first link 608 relative to the first shoe 606 does not change. In this manner, the first shoe 606 and first link 608 move, via the first bracket 508, the first panel 204 from the intermediate position to the second position.

In some examples, to enable the first link 608 to rotate relative to the first shoe 606 in the second rotational direction 632, the above mentioned operations associated with the first shoe 606 and the first shoe 606 are performed and/or otherwise occur in reverse order. For example, the first shoe 606 moves relative to first link 608 in the fourth linear direction 640, thereby causing the first link 608 rotate in the second rotational direction 632 relative to the second joint 614 and/or the fourth joint 634.

Thus, the eleventh and twelfth channels 1200, 1202 of FIG. 12 are sized, shaped, structured, and/or otherwise configured to particularly control the movement of the first link 608 via the pins 1204, 1206 based on movement of the first shoe 606 relative to the first link 608. In particular, the first link 608 rotates relative to the second joint 614 and/or the fourth joint 634 based on the position of the first shoe 606 relative to the first link 608, as previously mentioned. Although FIG. 12 depicts aspects in connection with the first actuator 602, in some examples, such aspects likewise apply to one or more other actuators such as, for example, the second actuator 604. For example, the second shoe 652 may be sized, shaped, structured, and/or otherwise configured similar or the same relative to the first shoe 606. Further, the second link 654 may be sized, shaped, structured, and/or otherwise configured similar or the same relative to the first link 608.

Additionally, in some examples, the first and third portions 1220, 1222 of the eleventh channel 1200 are substantially perpendicular relative to each other, as shown in FIG. 12. That is, in such examples, the first and second areas 1232, 1236 of the first surface 1212 form and/or define an example angle (e.g., between about 80 degrees and about 100 degrees). Accordingly, the eleventh channel 1200 of FIG. 12 is L-shaped. Further, as shown in FIG. 12, the first link 608 has a first end 1238 and a second end 1240 opposite the first end 1238. In some examples, the ninth pin 1204 is positioned at or near the first end 1238 of the first link 608. Further, in some examples, the fifth pin 948 is positioned at or near the second end 1240.

Figure 13A:
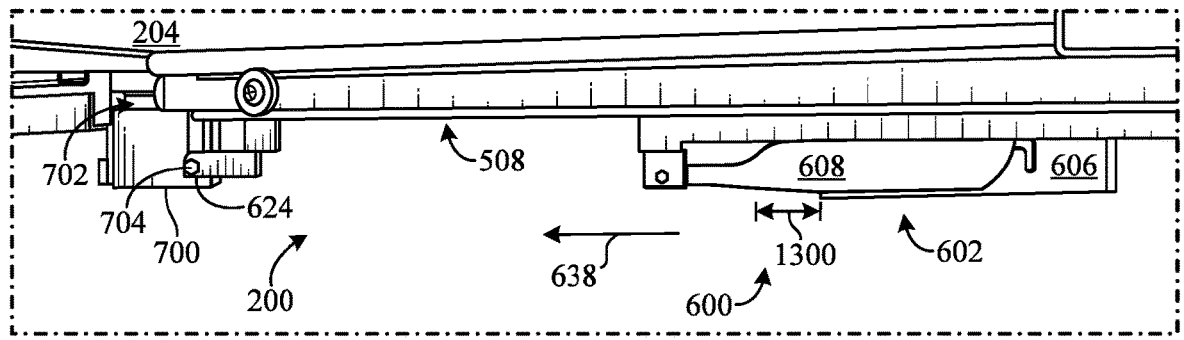
FIGS. 13A, 13B, and 13C are enlarged partial-views of the example vehicle sunroof of FIG. 2 and show different positions of the example actuator of FIG. 12 as an example sunroof panel moves.
Figure 13B:
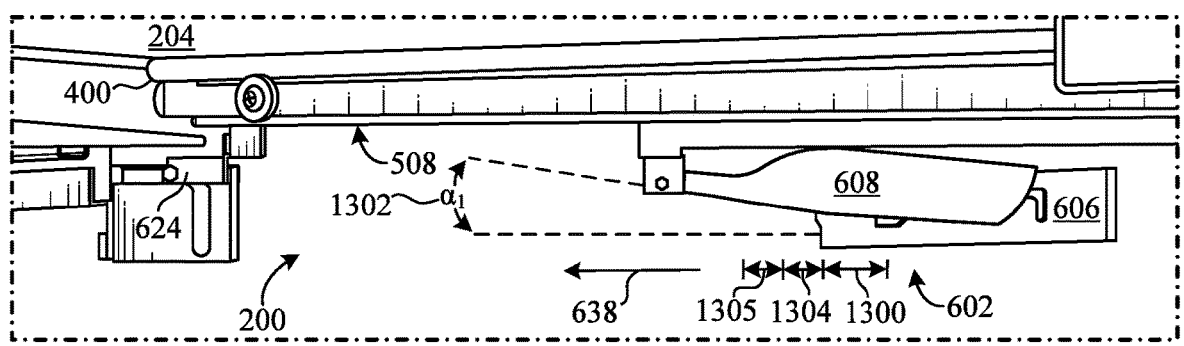
Figure 13C:
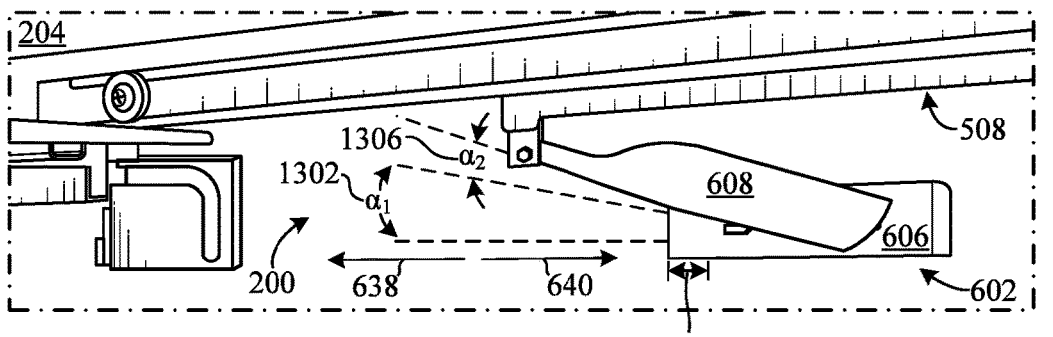

FIGS. 13A, 13B, and 13C are enlarged partial-views of the sunroof 200 and show different positions of the first actuator 602 as the first panel 204 moves, for example, from the first position (e.g., see FIG. 2) to the second position (e.g., see FIG. 3). According to the illustrated example of FIG. 13A, the first panel 204 is in the first position thereof. In particular, as the first shoe 606 begins moving in the third linear direction 638 (e.g., via the motor(s) 104), the third guide block 700 applies the resistance to the first end 624 of the first bracket 508 (e.g., via the first channel 702 and the first pin 704), which substantially prevents the first link 608 from moving in the third linear direction 638 cooperatively with the first shoe 606. In this manner, the first shoe 606 is enabled to move relative to the first link 608 in the third linear direction 638 and slidably engage the first link 608. For example, the first shoe 606 moves from the first position relative to the first link 608 to the second position relative to the first link 608. In some examples, the first shoe 606 moves across a first example distance (e.g., a relatively small distance such as 0.5 inches, 1 inch, 2 inches, etc.) 1300 relative to the first link 608 in response to such resistance. In such examples, the first distance 1300 is defined by and/or corresponds to the first portion 1224 and the second portion 1226 of the twelfth channel 1202.

As shown in FIG. 13B, the first link 608 rotates relative to the first shoe 606 across a first example angle 1302 as a result of the first shoe 606 moving across the first distance 1300, thereby raising the first end 624 of the first bracket 508 and, thus, the primary end 400 of the first panel 204. In this manner, the first actuator 602 changes from the first state to the second state (i.e., the actuator system 600 actuates to raise the first end 624). As such, the first shoe 606 of FIG. 13B is in the second position relative to the first link 608, and the first panel 204 of FIG. 13B is in the intermediate position thereof. As a result, the first link 608 is enabled to move cooperatively and/or together with the first shoe 606 in the third linear direction 638. For example, the first shoe 606 and the first link 608 then move together across a second example distance 1304. In particular, the first link 608 does not rotate relative to the first shoe 606 as the first shoe 606 and the first link 608 move together across the second distance 1304. As a result, such cooperative movement of the first shoe 606 and the first link 608 across the second distance 1304 urges the first panel 204 from the intermediate position towards the second position, which causes the first guide block 504 to begin raising the second end 644 of the first bracket 508 and the secondary end 300 of the first panel 204.

In such examples, the first shoe 606 of FIG. 13B then moves further in the third linear direction 638 relative to the first link 608 as a result of the first guide block 504 raising the second end 644 and the secondary end 300. In particular, the first shoe 606 is enabled to move relative to the first link 608 across a third example third example distance 1305. In some examples, the third distance 1305 is less than the first distance 1300. In such examples, the third distance 1305 is defined by and/or corresponds to the third portion 1228 of the twelfth channel 1202.

As shown in FIG. 13C, the first link 608 rotates further relative to the first shoe 606 across a second example angle 1306 as a result of the first shoe 606 moving across the third distance 1305 relative to the first link 608, thereby allowing the first guide block 504 to fully raise the second end 644 of the first bracket 508 and, thus, the secondary end 300 of the first panel 204. For example, the first shoe 606 moves from the second position relative to the first link 608 to the third position relative to the first link 608. That is, the first actuator 602 changes from the second state to the third state. In some examples, the second angle 1306 is less than the first angle 1302. Further, after the first shoe 606 moves across the third distance 1305 relative to the first link 608, the first shoe 606 and the first link 608 are again enabled to move cooperatively and/or together along the rail 502 in the third linear direction 638, thereby moving the first panel 204 to the second position (e.g., see FIG. 3).

Conversely, in some examples, to move the first panel 204 back to the first position and/or otherwise lower the primary and secondary ends 400, 300 of the first panel 204, the operations depicted in connection with FIGS. 13A, 13B, and 13C are performed and/or otherwise occur in reverse order. Further, although FIGS. 13A, 13B, and 13C depict aspects in connection with the first actuator 602, in some examples, such aspects likewise apply to one or more of the other actuators of the actuator system 600 such as, for example, the second actuator 604. Thus, in some examples, the second actuator 604 is operated similar to that of the first actuator 602 to move the second panel 206 from the first position (e.g., see FIG. 2) to the second position (e.g., see FIG. 4).

It will be appreciated that dual panel sunroof apparatus for use with vehicles disclosed in the foregoing description provide numerous advantages. Examples disclosed herein provide a vehicle sunroof including two movable sunroof panels that are each configured to open and/or close the sunroof to improve comfort of vehicle occupant(s). Disclosed examples provide one or more examples guide blocks and one or more example actuators that work cooperatively to move the sunroof panels, which reduces complexity, costs, and/or production time associated with the sunroof. Further, some disclosed examples provide example panel brackets to facilitate supporting the sunroof panels and guiding movement of the sunroof panels over each other, which saves space and/or packaging size of the disclosed sunroof.

Although certain example systems and apparatus have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A sunroof for a vehicle, comprising:
   a first bracket movable along a rail and coupled to a first panel;
   a second bracket movable along the rail and coupled to a second panel;
   an actuator configured to move the first or second bracket, movement of the first bracket to position the first panel over the second panel, movement of the second bracket to position the second panel over the first panel; and
   a central guide block operatively interposed between the first and second brackets to guide movement thereof, the central guide block configured to apply a resistance to at least a first end of the first bracket to enable the actuator to raise or lower the first panel.

2. The sunroof of claim 1, wherein the central guide block defines a first channel configured to slidably receive a first pin coupled to the first bracket and a second channel configured to slidably receive a second pin coupled to the second bracket, at least the first channel to guide the first pin through the first channel and into the second bracket as the first panel moves over the second panel.

3. The sunroof of claim 2, wherein the first channel is positioned on a first side of the central guide block and the second channel is positioned on a second side of the central guide block opposite the first side.

4. The sunroof of claim 2, wherein the first channel includes first portion and a second portion connected to the first portion, the first portion substantially perpendicular relative to the second portion.

5. The sunroof of claim 4, wherein the first portion extends substantially along a vertical axis and the second portion extends substantially along a horizontal axis.

6. The sunroof of claim 4, wherein the central guide block includes an inner surface that forms the first channel and corresponds to the first portion, the inner surface configured to impart a force on the first pin to substantially prevent the first pin from moving in a horizontal direction.

7. The sunroof of claim 4, wherein the central guide block includes an inner surface that forms the first channel and corresponds to the second portion, the inner surface configured to impart a force on the first pin to substantially prevent the first pin from moving in a vertical direction.

8. The sunroof of claim 2, wherein the second bracket includes a third channel positioned thereon that is configured to slidably receive the first pin from the first channel of the central guide block.

9. The sunroof of claim 8, wherein the second bracket includes a first portion and a second portion coupled to the first portion, the first portion supporting the second panel and including a track that defines the third channel.

10. The sunroof of claim 9, wherein the first portion of the second bracket includes a wall and a space formed by the wall and the track, a joint of the second bracket coupling the first and second portions together and at least partially positioned within the space.

11. The sunroof of claim 10, wherein the joint includes a clinched joint formed by the first and second portions.

12. The sunroof of claim 9, wherein the first portion includes aluminum and the second portion includes steel.

13. The sunroof of claim 1, further including first and second end guide blocks positioned on opposite ends of the rail, the first end guide block configured to slidably receive a first pair of pins coupled to the first bracket, the second end guide block configured to slidably receive a second pair of pins coupled to the second bracket, at least the first end guide block configured to raise or lower a second end of the first panel, opposite the first end, as the first pair of pins travels through the first end guide block.

14. The sunroof of claim 13, wherein the first end guide block defines a first pair of channels configured to guide the first pair of pins through the first pair of channels and into the rail.

15. The sunroof of claim 14, wherein the first bracket includes an arm and a U-shaped portion coupled to the arm at or near an end of the arm, the first pair of pins coupled to the U-shaped portion.

16. The sunroof of claim 1, wherein the actuator includes:
   a link rotatably coupled to the first bracket and movable along the rail; and
   a shoe slidably coupled to the first link and movable along the rail, movement of the shoe relative to the link to rotate the link.

17. The sunroof of claim 16, wherein the shoe defines first and second channels that slidably receive respective first and second pins coupled to the link, the first pin and the first channel forming a first joint, the second pin and the second channel forming a second joint, the link rotatable relative to the first or second joint based on a position of the shoe relative to the link.

18. The sunroof of claim 17, wherein the first channel is L-shaped and the second channel is Z-shaped.

* * * * *